(12) United States Patent
Watanabe et al.

(10) Patent No.: US 8,790,523 B2
(45) Date of Patent: Jul. 29, 2014

(54) METHOD FOR MANUFACTURING MAGNETIC HEAD

(75) Inventors: Hisayoshi Watanabe, Tokyo (JP); Yusuke Ide, Tokyo (JP)

(73) Assignee: TDK Corporation, Tokyo (JP)

( * ) Notice: Subject to any disclaimer, the term of this patent is extended or adjusted under 35 U.S.C. 154(b) by 425 days.

(21) Appl. No.: 12/349,732

(22) Filed: Jan. 7, 2009

(65) Prior Publication Data

US 2010/0170869 A1    Jul. 8, 2010

(51) Int. Cl.
*B44C 1/22* (2006.01)
*H01L 21/302* (2006.01)
*H01L 21/461* (2006.01)

(52) U.S. Cl.
USPC ............................................ 216/22; 438/739

(58) Field of Classification Search
CPC .................. H05K 2203/1184; B81C 1/00142; B81C 2001/00746; B81C 2001/00769
USPC ...................... 216/67, 22; 438/739
See application file for complete search history.

(56) References Cited

U.S. PATENT DOCUMENTS

| | | | |
|---|---|---|---|
| 5,118,382 A * | 6/1992 | Cronin et al. | 438/740 |
| 7,037,574 B2 * | 5/2006 | Paranjpe et al. | 428/200 |
| 7,052,617 B2 * | 5/2006 | Huang et al. | 216/2 |
| 2004/0222185 A1 * | 11/2004 | Kawai | 216/22 |
| 2006/0061907 A1 * | 3/2006 | Sasaki et al. | 360/126 |
| 2009/0168236 A1 * | 7/2009 | Jiang et al. | 360/110 |

FOREIGN PATENT DOCUMENTS

| | | |
|---|---|---|
| JP | 2-82527 | 3/1990 |
| JP | 5-67604 | 3/1993 |
| JP | 8-167647 | 6/1996 |

OTHER PUBLICATIONS

S. Wolf and R.N. Tauber, "Silicon Processing for the VLSI Era, vol. 1—Process Technology", Lattice Press, California, 1986, pp. 521-535.*

* cited by examiner

*Primary Examiner* — Binh X Tran
*Assistant Examiner* — Thomas Pham
(74) *Attorney, Agent, or Firm* — Oblon, Spivak, McClelland, Maier & Neustadt, L.L.P.

(57) ABSTRACT

A method for manufacturing a magnetic head, includes forming, on a non-magnetic film, a main magnetic pole film with a body portion and a write magnetic pole portion continuous with the body portion, and etching the non-magnetic film such that an undercut is formed around the body portion and beneath the write magnetic pole portion. The undercut penetrates beneath the write magnetic pole portion in a track width direction. The method includes wet etching the non-magnetic film beneath the main magnetic pole film at the undercut, the undercut being at least partially filled with an organic filler. The method also includes, after removal of the organic filler, covering at least both sides of the write magnetic pole portion with a magnetic gap film, and forming a write shield film adjacent to the magnetic gap film. The undercut forms a hollow in the non-magnetic film underlying the write magnetic pole portion.

10 Claims, 25 Drawing Sheets

(A9)

(B92)

(C9)

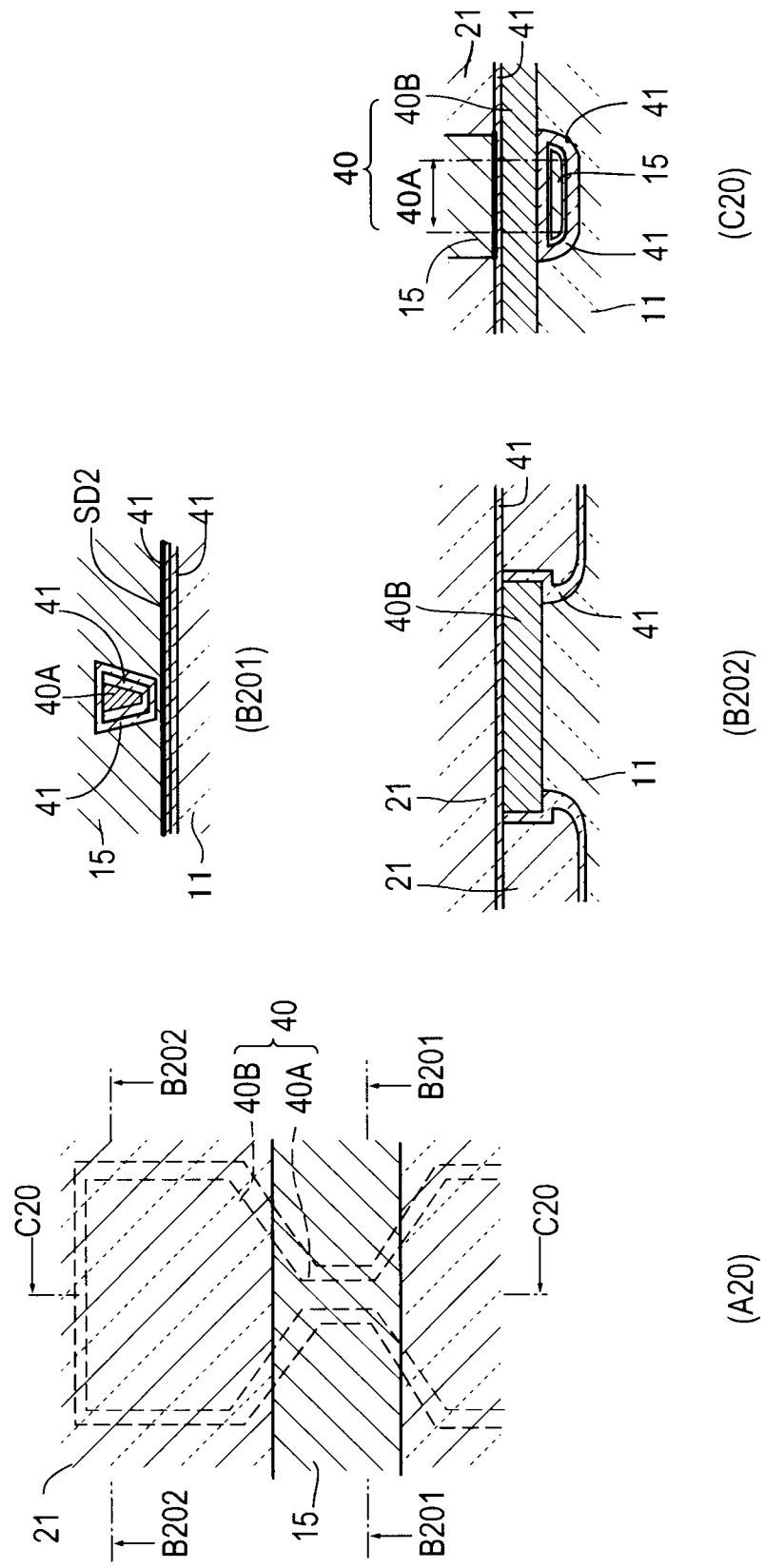

METHOD FOR MANUFACTURING MAGNETIC HEAD

TECHNICAL FIELD

The present invention relates to a method for manufacturing a magnetic head.

BACKGROUND OF THE INVENTION

In the field of magnetic heads to be mounted on a magnetic recording device such as a hard disk drive (HDD), recently, perpendicular recording method has become a predominant recording method in order to improve recording density with respect to a magnetic recording medium such as a hard disk. The perpendicular recording method provides not only a high linear recording density but also an advantage that the recording medium after recording is less influenced by thermal fluctuation.

As the perpendicular recording magnetic head, there has been known a magnetic head with a write shield film around a write magnetic pole, for example, as disclosed in U.S. Pat. No. 6,954,340. Between the write magnetic pole and the write shield film, there is disposed a magnetic gap film of a non-magnetic material. The write shield film has a function of preventing some of magnetic fluxes emitted from an end face of the write magnetic pole, which spread along directions other than the direction perpendicular to the surface of the magnetic medium, from reaching the magnetic medium. Such a magnetic head with a write shield film is called a wrap-around structure and capable of achieving much higher recording density.

The production process of a magnetic head with such a wrap-around structure includes after forming, on one face of a non-magnetic film made of an inorganic non-magnetic material such as alumina, a main magnetic pole film with a body portion of a large plane area and a write magnetic pole portion elongated in a plane area, the step of wet etching the one face of the non-magnetic film. Then, it also includes the steps of covering at least both sides of the write magnetic pole portion with a magnetic gap film and then wrapping the write magnetic pole portion with a write shield film through the magnetic gap film. The write shield film is generally formed by plating.

The step of wet etching is included mainly for lowering the surface of the non-magnetic film, on which the main magnetic pole film is formed, so that a write shield film can be formed with a required thickness. At this wet etching step, an undercut forms around the body portion and also beneath the write magnetic pole portion in the form of a hollow.

Since wet etching causes a hollow undercut beneath the write magnetic pole portion of an elongated plane area, as described above, the supporting strength of the write magnetic pole portion decreases, which may cause breakage of the write magnetic pole portion when a slight force is applied thereto at a resist peeling step or a foreign material removal step associated with the magnetic head production process of this type.

In addition, since the undercut is also formed around the body portion, when backfilling the surroundings of the body portion with a non-magnetic film such as alumina after wet etching, backfilling at the bottom of the undercut formed around the body portion may not be performed sufficiently, causing a heterocomponent within the non-magnetic film.

Moreover, when sputtering a seed film for plating, the seed film may not be sufficiently applied to the undercut formed around the body portion, leading to a plating defect.

One means for solving the above problems is to decrease the amount of wet etching, but since formation of a write shield film with a required thickness demands an appropriate amount of wet etching, there is a limit to decreasing the amount.

SUMMARY OF THE INVENTION

It is an object of the present invention to provide a manufacturing method that is effective in preventing breakage of a write magnetic pole portion in a production process of a magnetic head with a wrap-around structure.

It is another object of the present invention to provide a manufacturing method that is capable of suppressing generation of a heterocomponent due to insufficient backfilling of an undercut formed around a body portion in a production process of a magnetic head with a wrap-around structure.

It is still another object of the present invention to provide a manufacturing method that is capable of suppressing occurrence of a plating defect by deeply applying a seed film for plating into an undercut formed around a body portion in a production process of a magnetic head with a wrap-around structure.

In order to achieve at least one of the above objects, in a method for manufacturing a magnetic head according to the present invention, a main magnetic pole film with a body portion of a large plane area and a write magnetic pole portion elongated in a plane area is formed on one face of a non-magnetic film, and then the one face of the non-magnetic film is etched.

Then, the one face of the non-magnetic film is further etched with an undercut, which is caused by the etching around the body portion and beneath the write magnetic pole portion, being filled with an organic filler.

Then, after removal of the organic filler, at least both sides of the write magnetic pole portion are covered with a magnetic gap film, and a write shield film is further formed adjacent to the magnetic gap film.

Heretofore, the one face of the non-magnetic film with the main magnetic pole film has been etched by a single wet etching process at such a required etching amount that the write shield film can be formed with a required thickness. Accordingly, an undercut has been formed deeply around the body portion and also deeply beneath the write magnetic pole portion in the form of a hollow. This has caused the above mentioned problems.

In order to solve the above problems, according to the manufacturing method of the present invention, wet etching is divided in a plurality of stages. More specifically, the one face of the non-magnetic film is etched, and the undercut, which is caused by the etching around the body portion and beneath the write magnetic pole portion, is at least partially filled with an organic filler. Then, the one face of the non-magnetic film is further etched in this state.

Since second or further wet etching is performed with the undercut, which is formed around the body portion and beneath the write magnetic pole portion, being at least partially filled with an organic filler, the undercut will never further develop.

In addition, since wet etching is divided in two stages, first wet etching can be performed at a small etching amount.

According to the manufacturing method, therefore, breakage of the write magnetic pole portion in the production process can be prevented. In addition, generation of a heterocomponent due to insufficient backfilling of the undercut formed around the body portion can be suppressed. Moreover, occurrence of a plating defect can be suppressed by deeply applying a seed film for plating into the undercut formed around the body portion.

Then, after removal of the organic filler, at least both sides of the write magnetic pole portion are covered with a magnetic gap film, and a write shield film is further formed adjacent to the magnetic gap film.

The other objects, constructions and advantages of the present invention will be further detailed below with reference to the attached drawings. However, the attached drawings show only illustrative examples.

BRIEF DESCRIPTION OF THE DRAWINGS

FIG. 25 is a diagram showing a step after the step shown in FIG. 24, wherein (A20) is a plan view of the write main magnetic pole film, (B201) is a sectional view taken along line B201-B201 of (A20), (B202) is a sectional view taken along line B202-B202 of (A20), and (C20) is a sectional view taken along line C20-C20 of (A20).

DESCRIPTION OF THE PREFERRED EMBODIMENTS (Examples of Magnetic Head)

Referring to FIGS. 1 to 4, first will be described one example of a magnetic head to which the manufacturing method of the present invention is applicable. However, the manufacturing method of the present invention should not be understood as limited to the illustrated magnetic head. The drawings are shown to merely facilitate the understanding of the position of the present invention with respect to the entire structure of the magnetic head.

The illustrated magnetic head is to be used in combination with a rapidly spinning magnetic recording medium such as a hard disk. Magnetic heads of this type are generally called "floating-type". First, referring to FIG. 1, the magnetic head has a slider substrate 1 of a generally rectangular prism structure. The slider substrate 1 has an air bearing surface 70 directly related to the floating characteristics, and a recording/reproducing head (100A, 100B) is disposed at a side end face located on the side of an air flow-out end (trailing edge) with respect to an air flow direction M.

Figure 1:
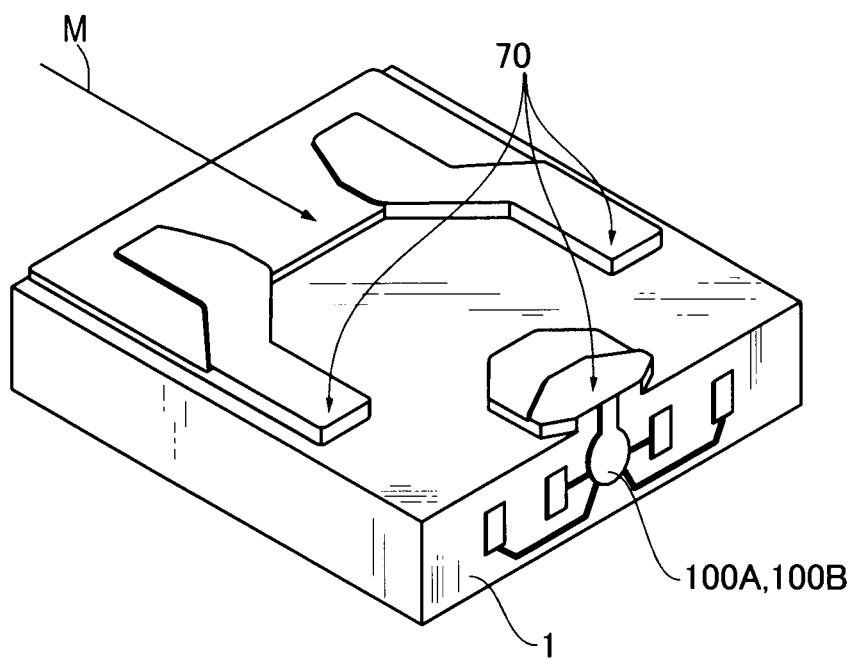
FIG. 1 is a perspective view showing one example of a magnetic head to which a manufacturing method of the present invention is applicable.
Figure 2:
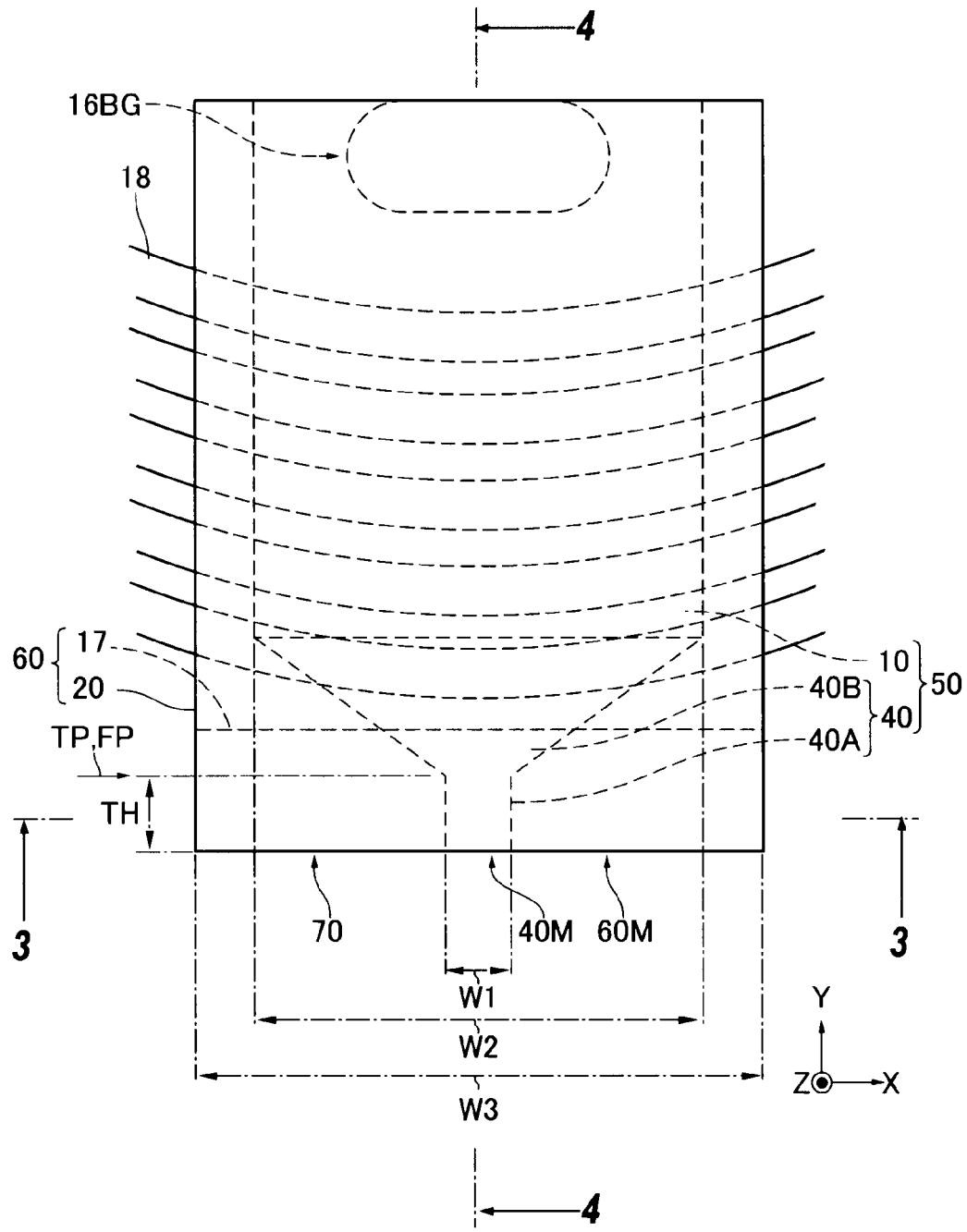
FIG. 2 is a plan view of a main magnetic pole film in the magnetic head shown in FIG. 1.
Figure 3:
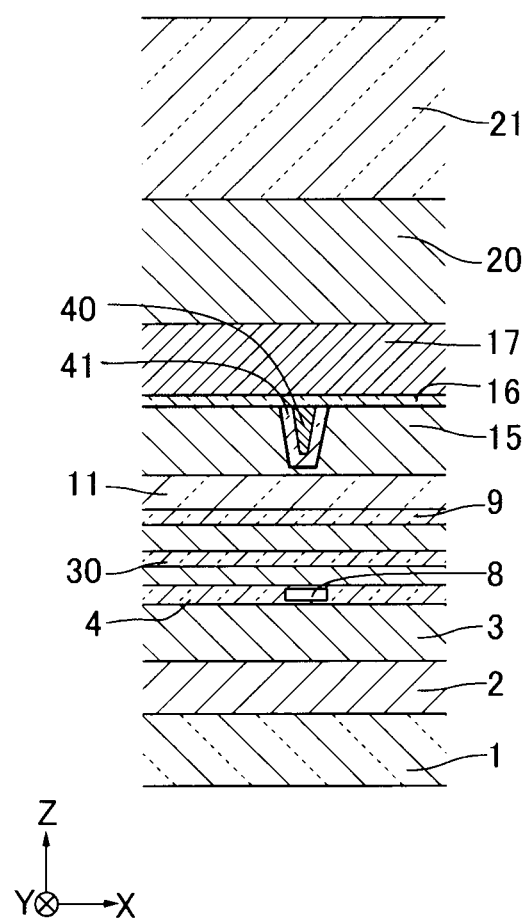
FIG. 3 is a sectional view taken along line 3-3 of FIG. 2.
Figure 4:
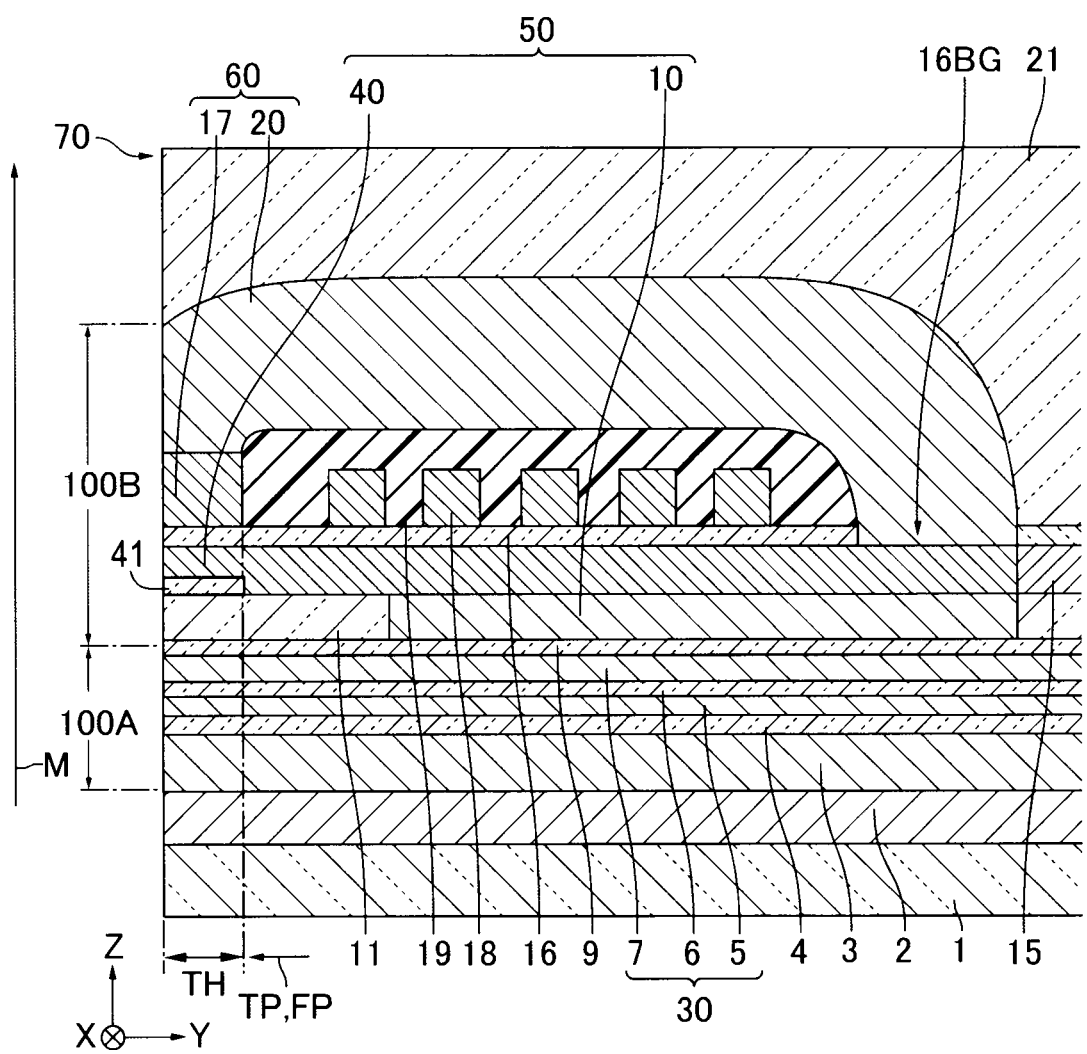
FIG. 4 is a sectional view taken along line 4-4 of FIG. 2.

Details of the recording/reproducing head (100A, 100B) are shown in FIGS. 2 to 4. In FIGS. 2 to 4, dimensions along X, Y and Z axes are called "width", "length" and "thickness/height", respectively. Along the Y axis, moreover, sides close to and remote from the air bearing surface 70 are designated by "front" and "rear", respectively, and being positioned forward and being positioned rearward are expressed by "project" and "recede", respectively.

The magnetic head shown in FIGS. 2 to 4 is a complex-type head which can perform both recording and reproducing. In the magnetic head, an insulating film 2, the reproducing head 100A using magneto-resistive effect (MR), a separating film 9, the recording head 100B for performing a recording process in a perpendicular recording method, and a non-magnetic film 21 for serving as an overcoat film are stacked on the slider substrate 1 in the mentioned order.

The reproducing head 100A is formed, for example, by stacking a lower read shield film 3, a shield gap film 4, and an upper read shield film 30 in the mentioned order. In the shield gap film 4, a reproducing head (or MR element 8) is embedded in such a manner as to be exposed on the air bearing surface 70.

Both the lower read shield film 3 and the upper read shield film 30 function to magnetically separate the MR element 8 from the surroundings and extend rearward from the air bearing surface 70. The lower read shield film 3 is made of, for example, a magnetic material such as a nickel-iron alloy (NiFe). The upper read shield film 30 is formed, for example, by stacking two upper read shield film portions 5, 7 with a non-magnetic film 6 interposed therebetween. Both the upper read shield film portions 5, 7 are made of, for example, a magnetic material such as a nickel-iron alloy. The non-magnetic film 6 is made of, for example, a non-magnetic material such as ruthenium (Ru) or alumina.

The shield gap film 4 functions to electrically separate the MR element 8 from the surroundings and is made of, for example, a non-magnetic insulating material such as alumina. The MR element 8 uses giant magneto-resistive effect (GMR) or tunneling magneto-resistive effect (TMR), for example.

The recording head 100B includes a non-magnetic film 11, a magnetic pole film 50, a magnetic gap film 16 with an opening (or back gap 16BG) for magnetic connection, a coil film 18 embedded in an insulating film 19, a magnetic film 60, a first write shield film 15, and a second write shield film 17.

The non-magnetic film 11 functions to electrically and magnetically separate an auxiliary magnetic pole film 10 from the surroundings and is made of, for example, a non-magnetic material such as alumina.

The magnetic pole film 50 extends rearward from the air bearing surface 70 and includes the auxiliary magnetic pole film 10 and a main magnetic pole film 40.

The auxiliary magnetic pole film 10 extends from behind the air bearing surface 70 to the back gap 16BG. For example, the auxiliary magnetic pole film 10 is disposed on the leading side with respect to the main magnetic pole film 40 and has a rectangular plan shape (width W2), as shown in FIG. 2. However, it is also possible to dispose the auxiliary magnetic pole film 10 on the trailing side of the main magnetic pole film 40.

The main magnetic pole film 40 extends from the air bearing surface 70 to the back gap 16BG. The main magnetic pole film 40 includes, for example, a small-width write magnetic pole portion 40A extending rearward from the air bearing surface 70 and a large-width body portion 40B continuous with the rear of the write magnetic pole portion 40A, as shown in FIG. 2.

The write magnetic pole portion 40A is a substantial magnetic flux emitting portion (so-called magnetic pole film) and has a constant width W1 which defines the recording track width. The body portion 40B is a portion intended to supply a magnetic flux to the write magnetic pole portion 40A and has a width W2 larger than the width W1. The width of the body portion 40B decreases in its front portion toward the write magnetic pole portion 40A. The position where the width of the main magnetic pole film 40 starts to increase from the width W1 to the width W2 is a so-called flare point FP.

An end face 40M of the main magnetic pole film 40 on the side close to the air bearing surface 70 is of an inverted trapezoidal shape, whose upper bottom and lower bottom are the longer side on the trailing side and the shorter side on the leading side, respectively. The upper end edge of the trapezoidal shape is a substantial recording portion, and its width W1 is approximately 0.2 µm or less.

The magnetic gap film 16 is a gap for magnetically separating the magnetic pole film 50 and the magnetic film 60 and is made of, for example, a non-magnetic insulating material such as alumina or a non-magnetic conductive material such as ruthenium. The thickness of the magnetic gap film 16 is approximately 0.01 to 0.1 µm.

The coil film 18 functions to generate a magnetic flux and is made of, for example, a highly conductive material such as copper (Cu). The coil film 18 is wound around the back gap 16BG to have a winding structure (or spiral structure), as shown in FIG. 2.

The insulating film 19 functions to electrically separate the coil film 18 from the surroundings and is made of, for example, a non-magnetic insulating material such as a photoresist or a spin on glass (SOG) which becomes liquid when heated. The forefront position of the insulating film 19 is a throat height zero position TP, and the distance between the throat height zero position TP and the air bearing surface 70 is a so-called "throat height TH". FIG. 2 shows a case where the throat height zero position TP matches the flare point FP.

Figure 10:
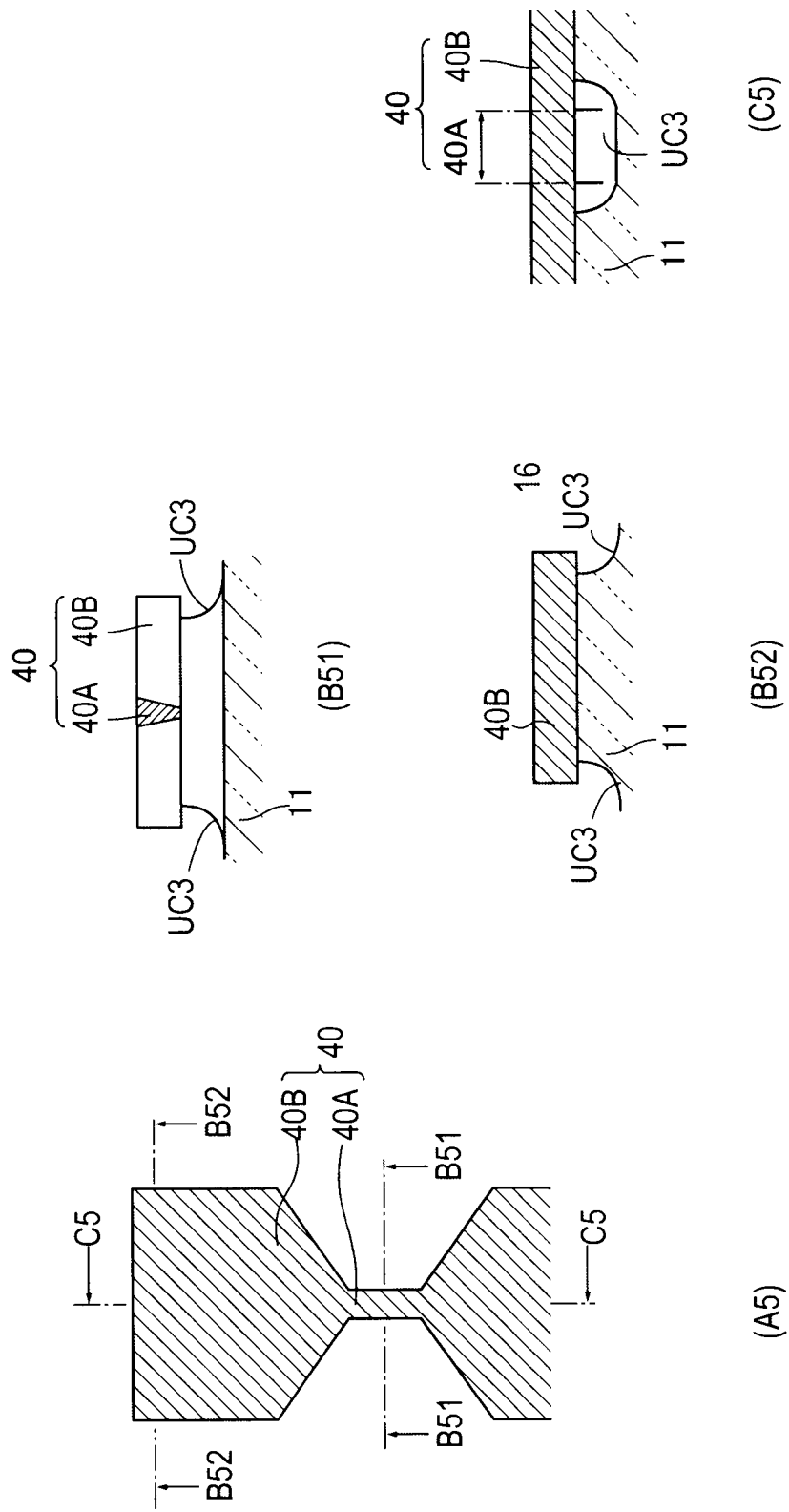
FIG. 10 is a diagram showing a step after the step shown in FIG. 9, wherein (A5) is a plan view of the write main magnetic pole film, (B51) is a sectional view taken along line B51-B51 of (A5), and (C5) is a sectional view taken along line C5-C5 of (A5)

The magnetic film 60 functions to absorb a spreading component of a magnetic flux emitted from the magnetic pole film 50 so as to increase the gradient of the perpendicular magnetic field and also absorb a magnetic flux returning from a recording medium so as to circulate the magnetic flux between the recording head 100B and a recording medium. The magnetic film 60, which extends rearward from the air bearing surface 70 on the trailing side of the magnetic pole film 50, is separated from the magnetic pole film 50 by the magnetic gap film 16 at its front but connected to the magnetic pole film 50 through the back gap 16BG at its rear. An end face 60M of the magnetic film 60 on the side close to the air bearing surface 70 is, for example, of a rectangular shape having a width W3 larger than the width W1, as shown in FIG. 10. The magnetic film 60 includes, for example, the second write shield film 17 and a return yoke film 20 which are distinct from each other.

The first and second write shield films 15, 17 function to mainly increase the gradient of the perpendicular magnetic field and are made of, for example, a high saturation magnetic flux density magnetic material such as a nickel-iron alloy or an iron-based alloy. The first and second write shield films 15, 17 constitute a so-called wrap-around structure. In the illustrated wrap-around structure, through a magnetic gap film 41, the first write shield film 15 is adjacent to both sides of the write magnetic pole portion 40A of the main magnetic pole film 40 at the medium facing surface side. At both sides of the write magnetic pole portion 40A, therefore, the write shield film 15 forms a side shield film.

In addition, through the magnetic gap film 16, the second write shield film 17 is adjacent to the upper surface of the write magnetic pole portion 40A at the medium facing surface side. The second write shield film 17 is a so-called pedestal yoke, and the magnetic gap film 16 interposed between the second write shield film 17 and the upper surface of the write magnetic pole portion 40A serves as a write gap.

With the above configuration, the first and second write shield films 15, 17 function to absorb a spreading component of a magnetic flux emitted from the magnetic pole film 50, thereby increasing the magnetic field gradient of the perpendicular magnetic field and decreasing the recording width.

The second write shield film 17 is adjacent to the magnetic gap film 16 and extends rearward from the air bearing surface 70 to have its rear end adjacent to the insulating film 19. Thus, the write shield film 17 serves to define the forefront position (throat height zero position TP) of the insulating film 19.

The return yoke film 20 functions to circulate the magnetic flux and is made of, for example, a magnetic material similar to that of the write shield film 17. The return yoke film 20 extends from the air bearing surface 70, through above the insulating film 19, to the back gap 16BG on the trailing side of the write shield film 17 and is connected to the write shield film 17 at its front but to the magnetic pole film 50 at its rear through the back gap 16BG, as shown in FIG. 4.

The non-magnetic film 21 functions to protect the magnetic head and is made of, for example, a non-magnetic insulating material such as alumina.

Figure 5:
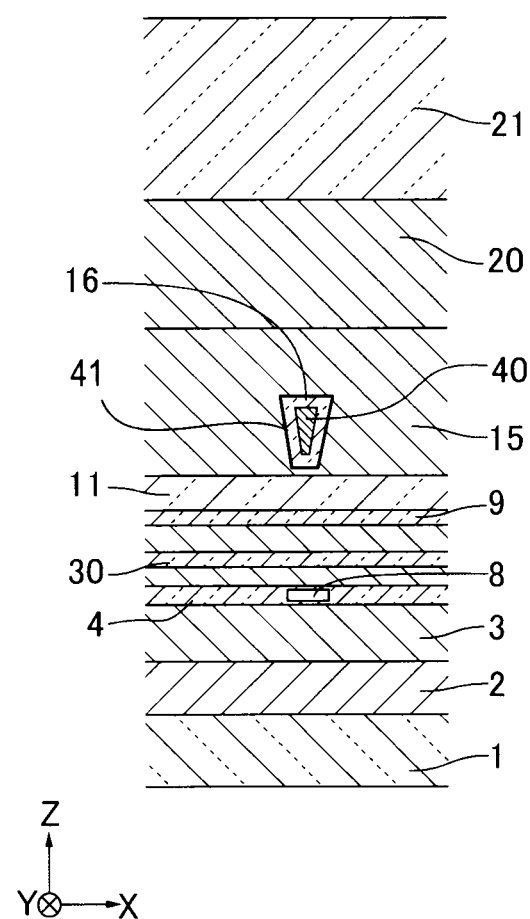
FIG. 5 is a sectional view taken along line 4-4 of another example.

FIG. 5 shows another example of the wrap-around structure. In this example, the write magnetic pole portion 40A is entirely covered with the magnetic gap film 41 and the upper magnetic gap film 16 continuous with each other, and a write shield film 15 corresponding to the first and second write shields (15, 17) is disposed therearound. That is, this structure is such that the write magnetic pole portion 40A is embedded in the write shield film 15, wherein the shield film at both sides of the write magnetic pole portion 40A functions as the side shield film while the shield film at the top functions as the second write shield film of FIGS. 1 to 4.

(Method for Manufacturing Magnetic Head)

In the magnetic head described above, the present invention is applicable to production of the main magnetic pole film 40 that is a main component of the perpendicular recording head 100B. The processes before the production process of the perpendicular recording head have been known heretofore and do not require specific description. Roughly speaking, it can be manufactured by stacking a series of components in order by using a conventional thin-film process including a film formation technique such as plating or sputtering, a patterning technique such as photolithography, an etching technique such as dry etching or wet etching, and a polishing technique such as CMP (chemical mechanical polishing).

When manufacturing the magnetic head, at first, the insulating film 2 is formed on the slider substrate 1, and then the lower read shield film 3, the shield gap film 4 embedded with the MR element 8, and the upper read shield film 30 (the upper read shield film portions 5, 7 and the non-magnetic film 6) are stacked on the insulating film 2 in a predetermined order, thereby forming the reproducing head 100A.

Then, after the separating film 9 is formed on the reproducing head 100A, the non-magnetic film 11, the first and second write shield films 15, 17, the magnetic pole film 50 (the auxiliary magnetic pole film 10 and the main magnetic pole film 40), the magnetic gap film 41, the coil film 18 insulated by the insulating film 19, and the return yoke film 20 are stacked in the predetermined processing order, thereby forming the recording head 100B. Finally, after the non-magnetic film 21 for functioning as an overcoat film is formed on the recording head 100B, the air bearing surface 70 is formed by using a machining process or a polishing process, thereby completing the magnetic head.

In the whole production process described above, the manufacturing method according to the present invention is mainly applicable to the process of forming the main magnetic pole film 40. It should be noted that the following production steps are all carried out on a wafer.

Figure 6:
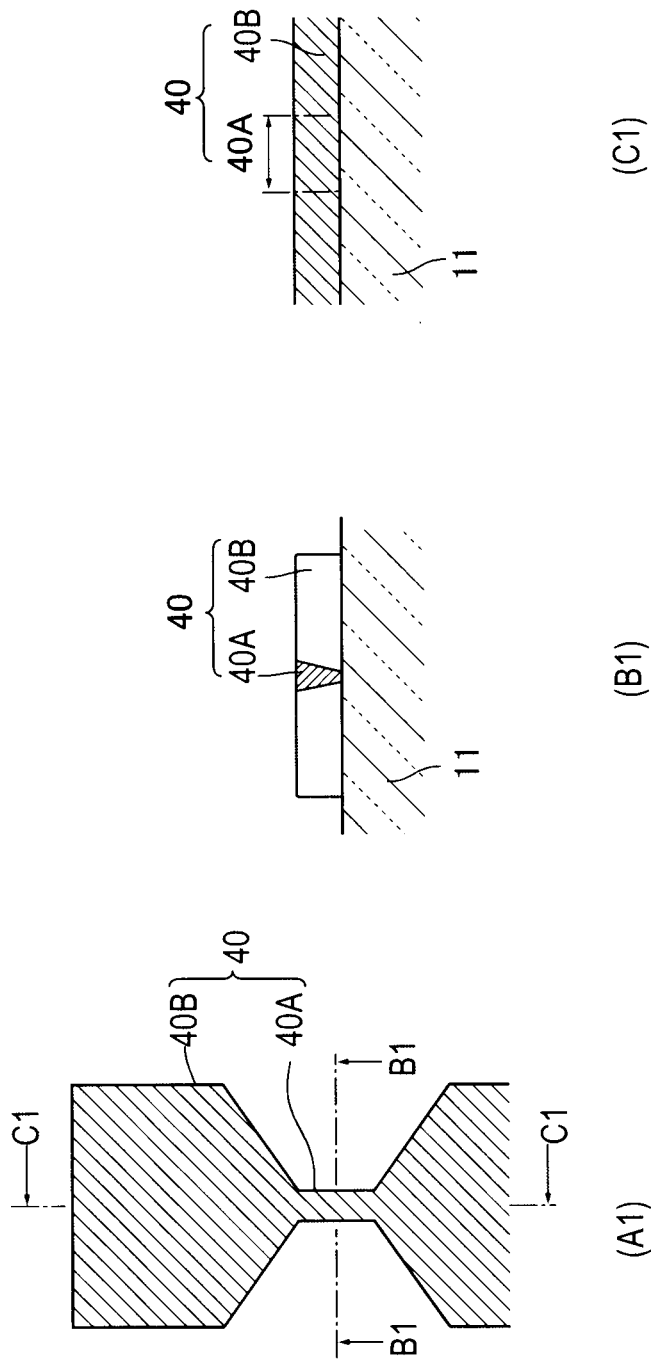
FIG. 6 is a diagram showing a step included in the magnetic head manufacturing method according to the present invention, wherein (A1) is a plan view of the write main magnetic pole film, (B1) is a sectional view taken along line B1-B1 of (A1), and (C1) is a sectional view taken along line C1-C1 of (A1)

As shown in FIGS. 6(A1), (B1) and (C1), at first, the main magnetic pole film 40 is formed on one face of the non-magnetic film 11 such as of $Al_2O_3$. The basic pattern and material of the main magnetic pole film 40 have been already described and the write magnetic pole portion 40A and the wide width portion 40B are provided.

Figure 7:
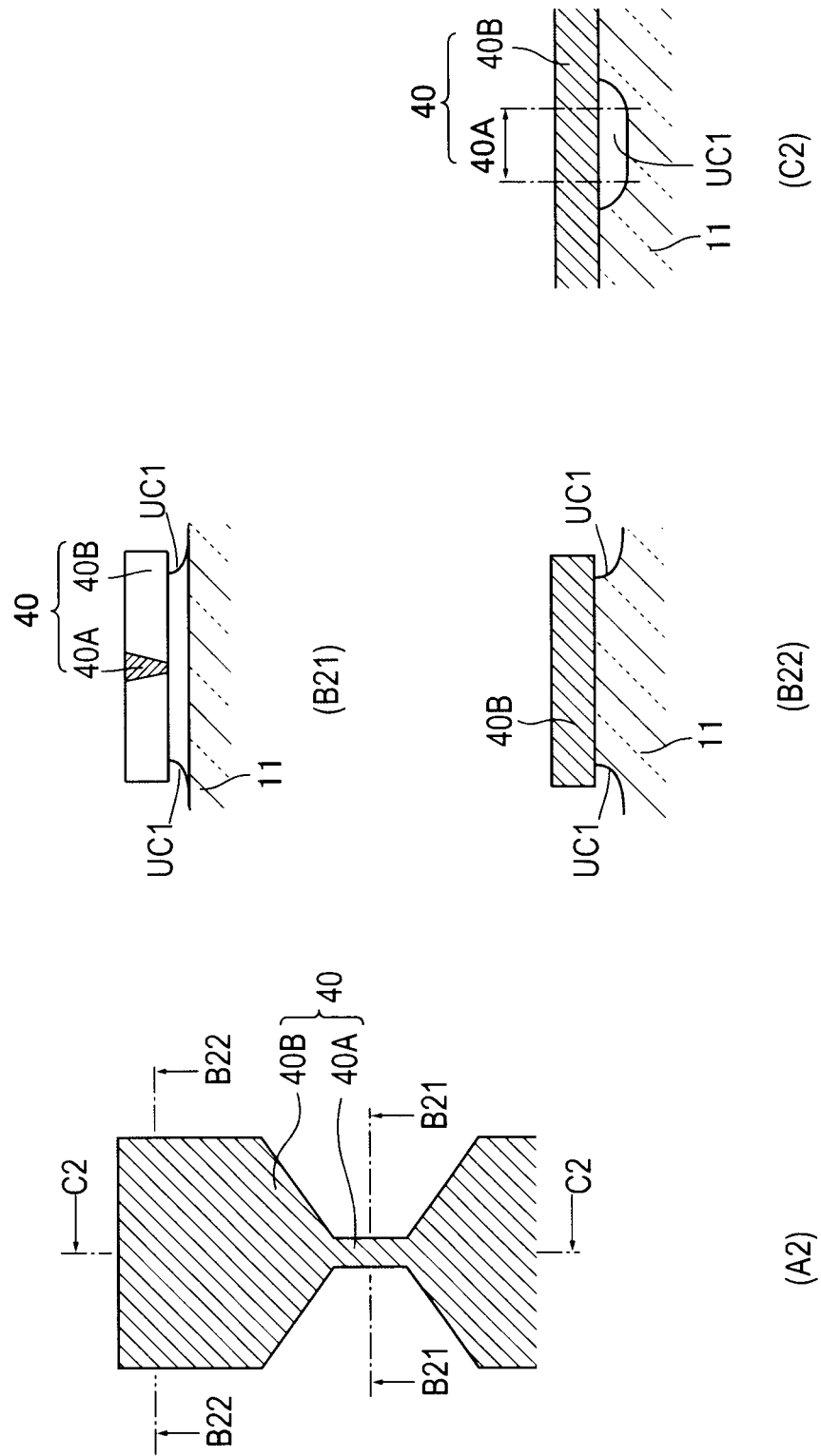
FIG. 7 is a diagram showing a step after the step shown in FIG. 6, wherein (A2) is a plan view of the write main magnetic pole film, (B21) is a sectional view taken along line B21-B21 of (A2), and (C2) is a sectional view taken along line C2-C2 of (A2)

Then, as shown in FIGS. 7(A2), (B21), (B22) and (C2), chemical etching (wet etching) is performed on one face of the non-magnetic film 11 where the main magnetic pole film 40 is formed. With this wet etching, the one face of the non-magnetic film 11 is etched to form an undercut UC1 beneath the main magnetic pole film 40. At the body portion 40B of the main magnetic pole film 40, the undercut UC1 only extends therearound, but at the write magnetic pole portion 40A, since the plane area is small, the undercut UC1 is formed in a hollow form with the underlying non-magnetic film 11 being completely removed.

The wet etching has been conventionally performed, but in the present invention, since further etching will be performed later, it is processed such that the etching amount is smaller as compared with the conventional cases. Accordingly, the depth of the hollow undercut UC1 formed beneath the write magnetic pole portion 40A (distance between the bottom surface of the undercut and the lower surface of the write magnetic pole portion 40A) is smaller than the depth caused by the conventional wet etching. The undercut UC1 formed around the body portion 40B is also shallower than before. This increases the supporting strength for the write magnetic pole portion 40A more than before, thereby preventing breakage of the write magnetic pole portion 40A in the production process.

Figure 8:
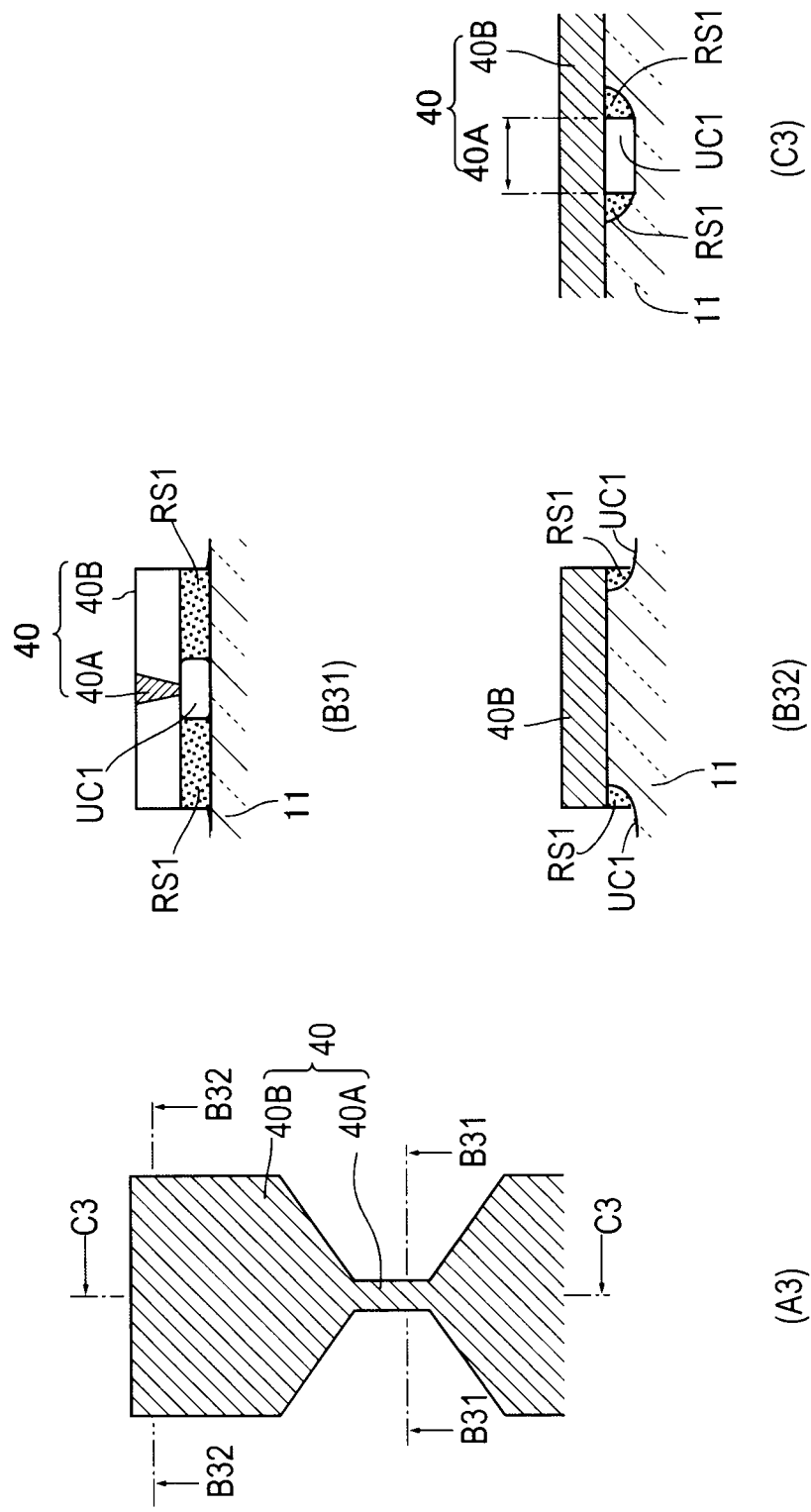
FIG. 8 is a diagram showing a step after the step shown in FIG. 7, wherein (A3) is a plan view of the write main magnetic pole film, (B31) is a sectional view taken along line B31-B31 of (A3), and (C3) is a sectional view taken along line C3-C3 of (A3)

Then, as shown in FIGS. 8(A3), (B31), (B32) and (C3), the undercut UC1, which is caused by the wet etching around the body portion 40B and beneath the write magnetic pole portion 40A, is at least partially filled with an organic filler RS1.

For filling the organic filler RS1, the photolithography process is performed. More specifically, after an appropriate photoresist selected from known resist materials is applied using a known means such as spin coat method, an exposing and developing process is performed. Typically, the resist is cured after developing. Since the main magnetic pole film 40 can be used as a mask for exposing, moreover, it is not necessary to use a reticle.

At the above step, not only the undercut UC1 formed around the body portion 40B is filled with the organic filler RS1, but also the undercut UC1 formed beneath the write magnetic pole portion 40A is filled with the organic filler RS1 at the connection to the body portion 40B. Beneath the straight portion of the write magnetic pole portion 40A, a hollow not filled with the organic filler RS1 is left.

Figure 9:
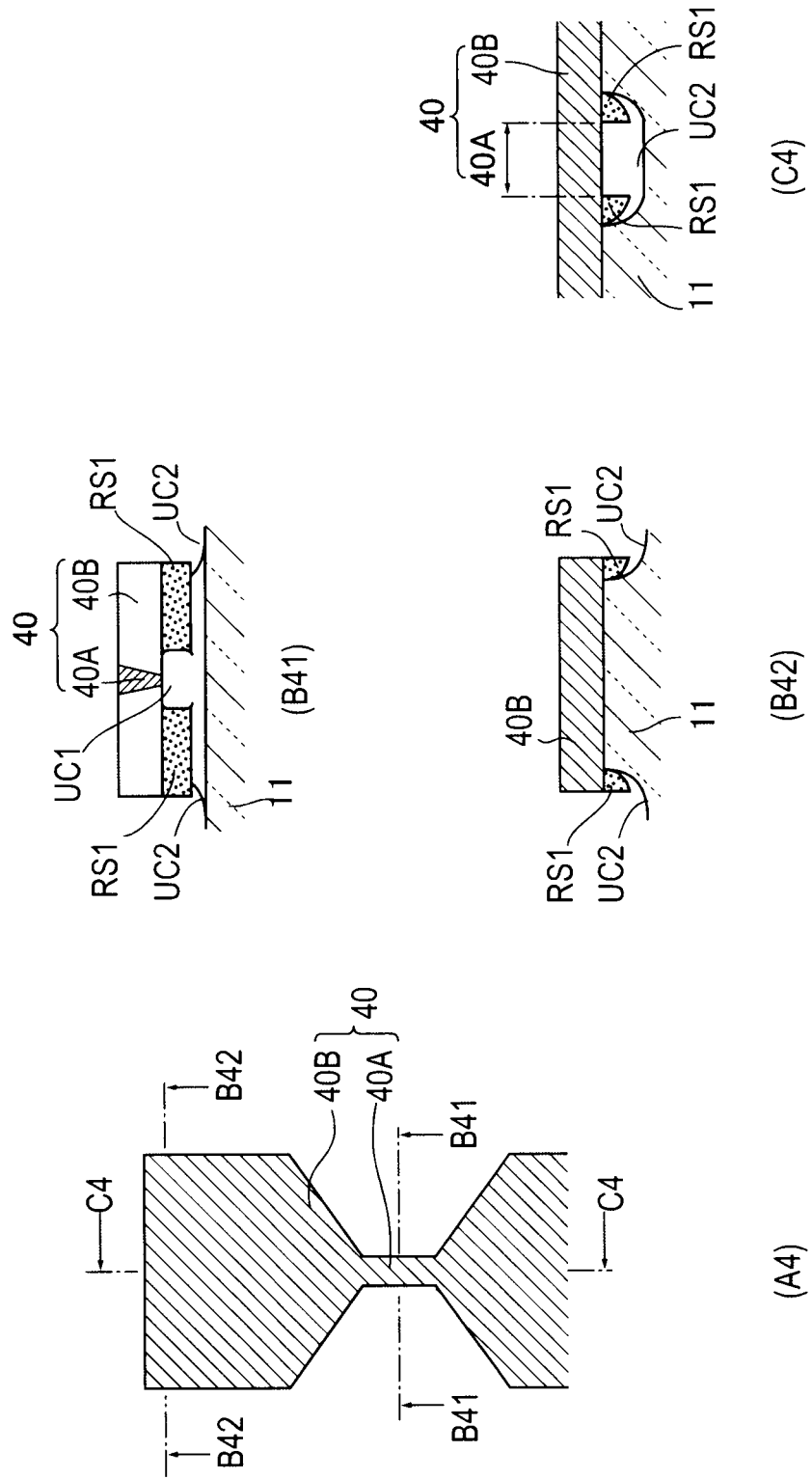
FIG. 9 is a diagram showing a step after the step shown in FIG. 8, wherein (A4) is a plan view of the write main magnetic pole film, (B41) is a sectional view taken along line B41-B41 of (A4), and (C4) is a sectional view taken along line C4-C4 of (A4)

Then, as shown in FIGS. 9(A4), (B41), (B42) and (C4), the one face of the non-magnetic film 11 is further etched with the undercut UC1, which is formed around the body portion 40B and beneath the write magnetic pole portion 40A, being at least partially filled with the organic filler RS1. This etching is also wet etching. Thus, the one face (surface) of the non-magnetic film 11 is lowered from the previous surface position due to the undercut UC1 to a position where the surface lowering amount due to this wet etching is added, thereby forming an undercut UC2.

In the manufacturing method of the present invention, as has been described hereinabove, wet etching is divided in plurality of stages. More specifically, the one face of the non-magnetic film 11 is etched, and the undercut UC1 caused by the etching around the body portion 40B and beneath the write magnetic pole portion 40A is at least partially filled with the organic filler RS1. Then, the one face of the non-magnetic film 11 is further etched in this state.

Since the second wet etching is performed with the undercut UC1, which is formed around the body portion 40B and beneath the write magnetic pole portion 40A, being at least partially filled with the organic filler RS1, the one face (surface) of the non-magnetic film 11 is just lowered but the undercut does not extend further beneath the main magnetic pole film 40.

In addition, since wet etching is divided in a plurality of stages, the first wet etching can be performed with a small etching amount. Accordingly, breakage of the write magnetic pole portion 40A in the production process can be prevented.

Then, as shown in FIGS. 10(A5), (B51), (B52) and (C5), the organic filler RS1 is peeled off and removed. Thus, an undercut UC3 is formed around the body portion 40B and beneath the write magnetic pole portion 40A after removal of the organic filler RS1. The undercut UC3 is the one obtained by removing the organic filler RS1 from the undercut UC2, wherein as compared with the undercut UC1, the one face (surface) of the non-magnetic film 11 is just lowered without extending the undercut further beneath the main magnetic pole film 40.

Figure 11:
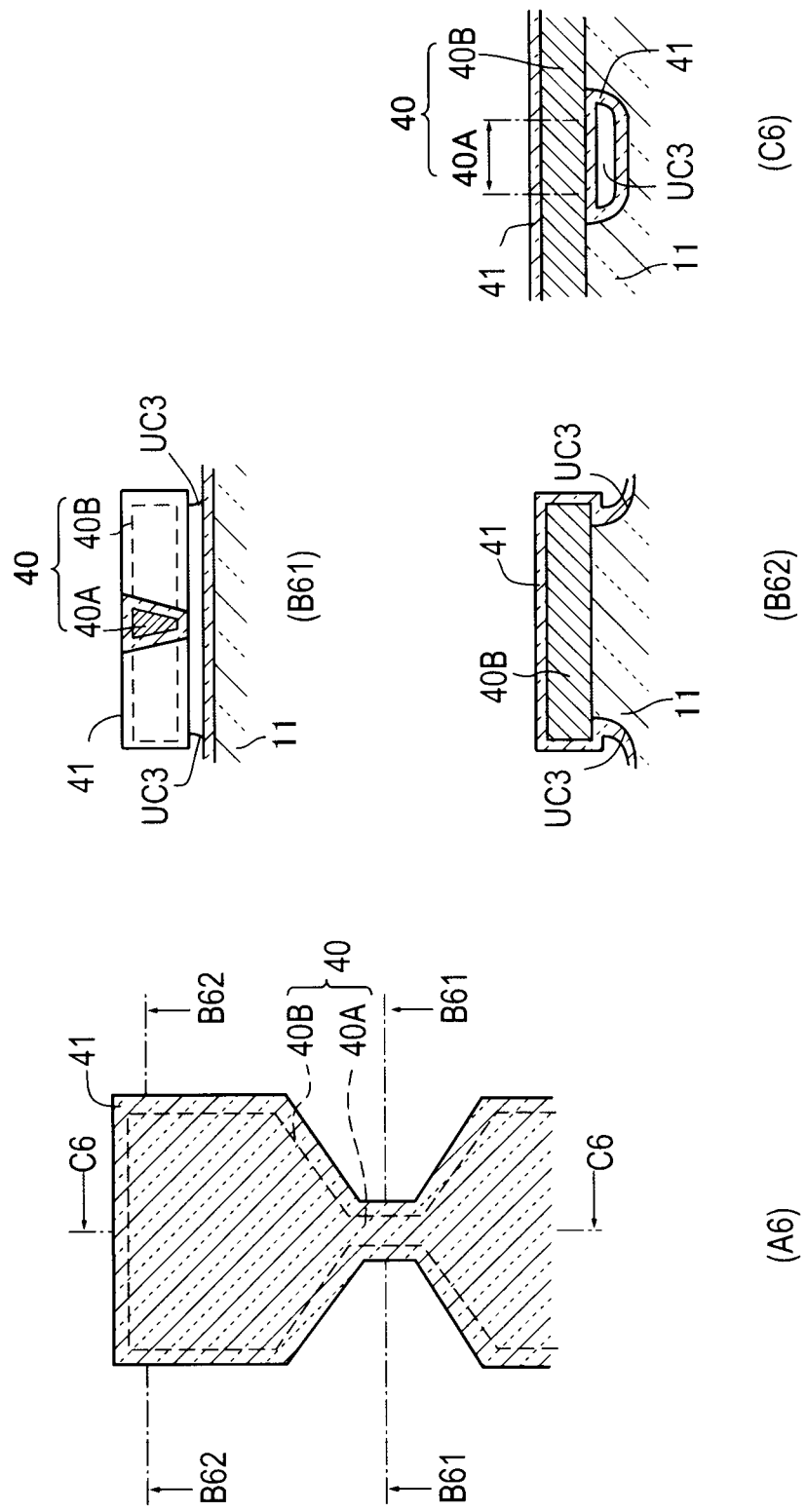
FIG. 11 is a diagram showing a step after the step shown in FIG. 10, wherein (A6) is a plan view of the write main magnetic pole film, (B61) is a sectional view taken along line B61-B61 of (A6), and (C6) is a sectional view taken along line C6-C6 of (A6)

Then, as shown in FIGS. 11(A6), (B61), (B62) and (C6), the non-magnetic film 41 is formed on each surface of the non-magnetic film 11 and the main magnetic pole film 40A. The non-magnetic film 41 is preferably formed by applying ALD (atomic layer deposition) technology. With the ALD technology, the non-magnetic film 41 can be formed with an extremely thin, dense film structure. Since the undercut UC3 is such that as compared with the undercut UC1, the one face (surface) of the non-magnetic film 11 is just lowered without extending the undercut further beneath the main magnetic pole film 40, the dense non-magnetic film 41 can be formed continuously on the surface of the non-magnetic film 11 and the surface of the main magnetic pole film 40A.

Figure 12:
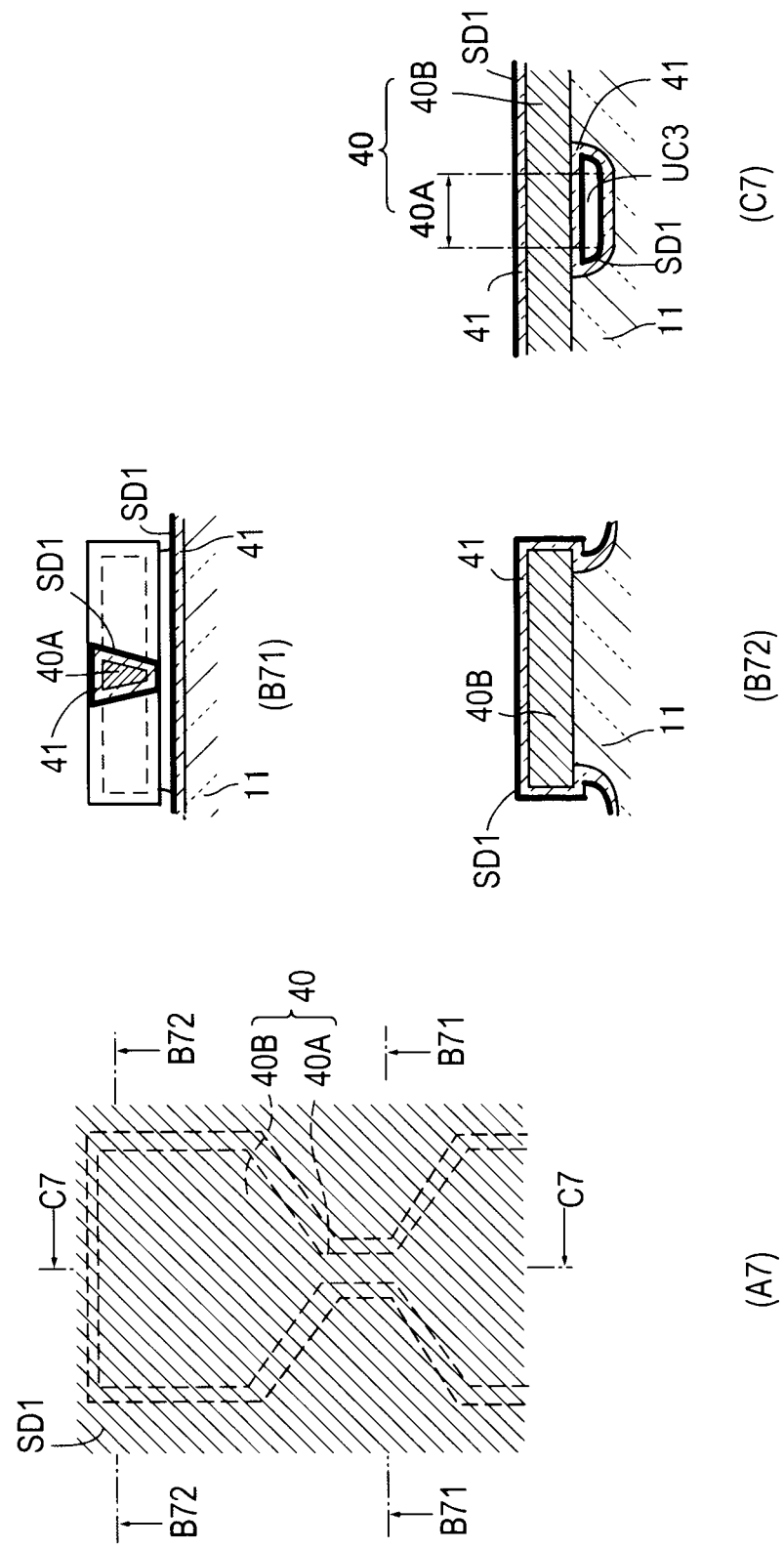
FIG. 12 is a diagram showing a step after the step shown in FIG. 11, wherein (A7) is a plan view of the write main magnetic pole film, (B71) is a sectional view taken along line B71-B71 of (A7), and (C7) is a sectional view taken along line C7-C7 of (A7)

Then, as shown in FIGS. 12(A7), (B71), (B72) and (C7), a seed film SD1 for plating is formed on the surface of the non-magnetic film 41 by means of, for example, sputtering. At this time, since the undercut UC3 is such that as compared with the undercut UC1, the one face (surface) of the non-magnetic film 11 is just lowered without extending the undercut further beneath the main magnetic pole film 40, the seed film SD1 for plating can be deeply applied into the undercut UC3 formed around the body portion 40B. This realizes formation of a high-quality continuous seed film SD1 on the surface of the non-magnetic film 41.

Figure 13:
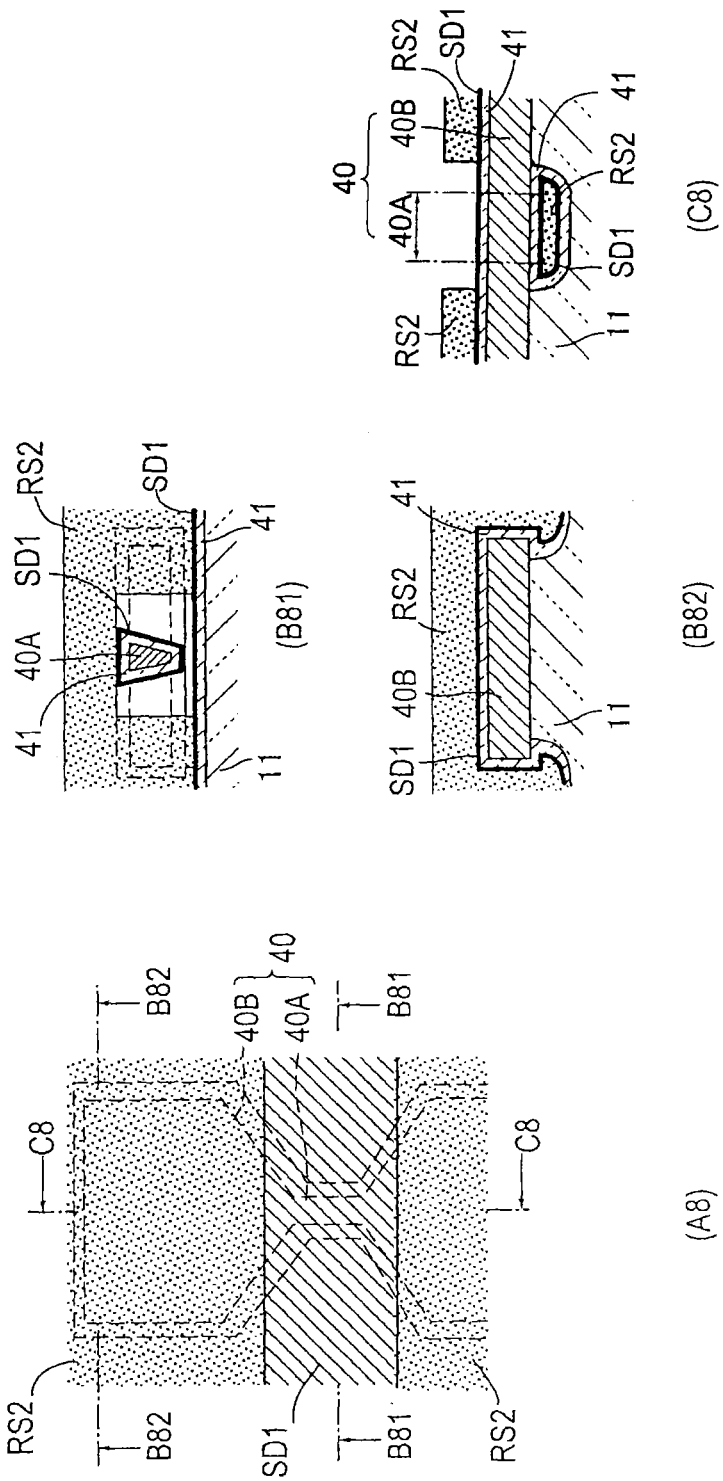
FIG. 13 is a diagram showing a step after the step shown in FIG. 12, wherein (A8) is a plan view of the write main magnetic pole film, (B81) is a sectional view taken along line B81-B81 of (A8), and (C8) is a sectional view taken along line C8-C8 of (A8)

Then, as shown in FIGS. 13(A8), (B81), (B82) and (C8), a resist RS2 is formed on the surface of the body portion 40B. The resist RS2 is formed without covering the write magnetic pole portion 40A and a front portion of the flare portion continuous with the write magnetic pole portion 40A. Of the main magnetic pole film 40, accordingly, the whole write magnetic pole portion 40A and the front portion of the flare portion have the seed film SD1 exposed, while the rest is covered with the resist film RS2.

Figure 14:
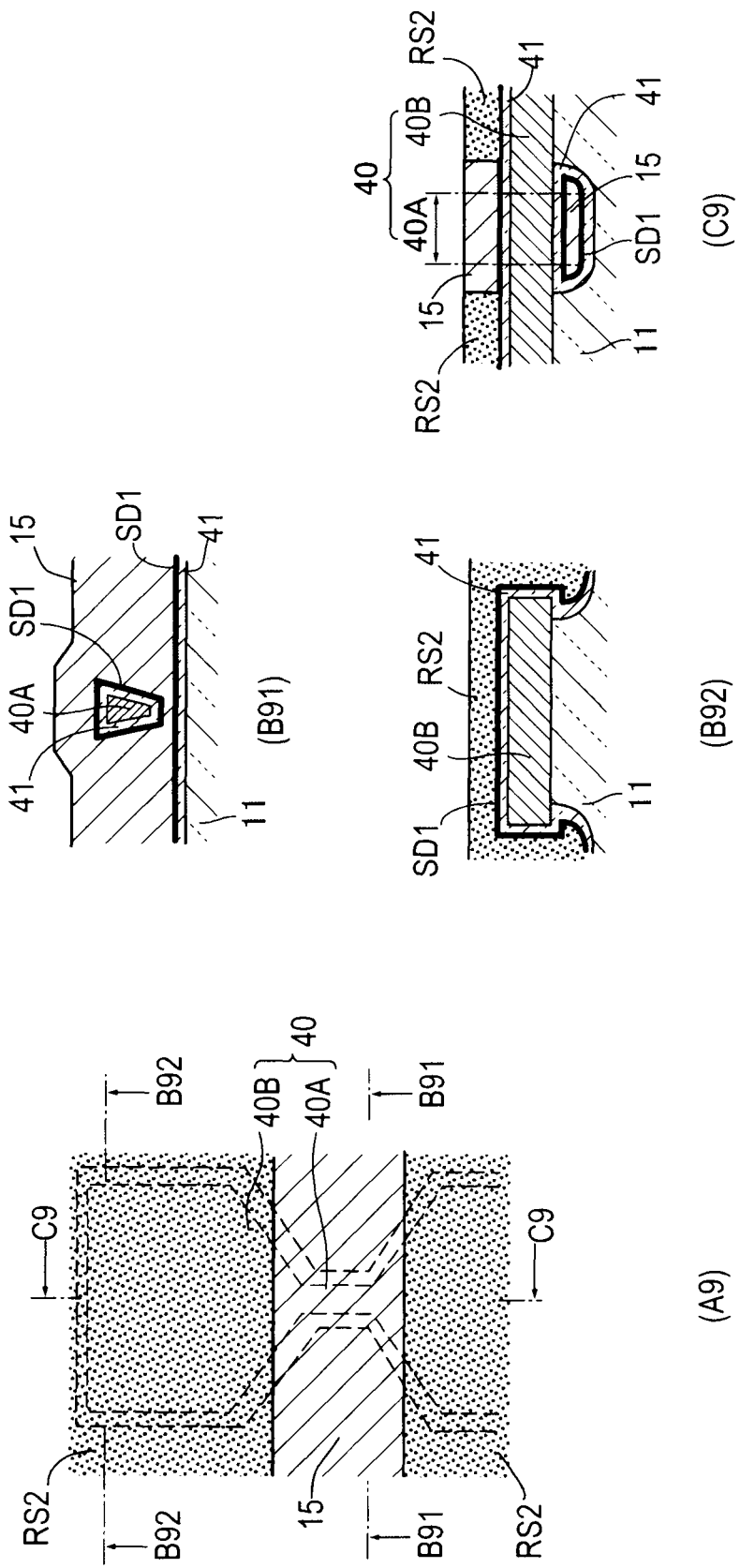
FIG. 14 is a diagram showing a step after the step shown in FIG. 13, wherein (A9) is a plan view of the write main magnetic pole film, (B91) is a sectional view taken along line B91-B91 of (A9), and (C9) is a sectional view taken along line C9-C9 of (A9)

Then, as shown in FIGS. 14(A9), (B91), (B92) and (C9), a magnetic plated film 15 is formed on the area not covered with the resist film RS2, i.e., the surface of the write magnetic pole portion 40A and the surface of the front portion of the flare portion continuous with the write magnetic pole portion 40A, by performing plating using the seed film SD1 as an electrode film. The magnetic plated film 15 is to serve as a write shield film and is made of a magnetic film such as NiFe. Since the seed film SD1 for plating can be deeply applied into the undercut UC3 formed around the body portion 40B, as has been described hereinabove, occurrence of a defect in the magnetic plated film 15 can be suppressed.

Figure 15:
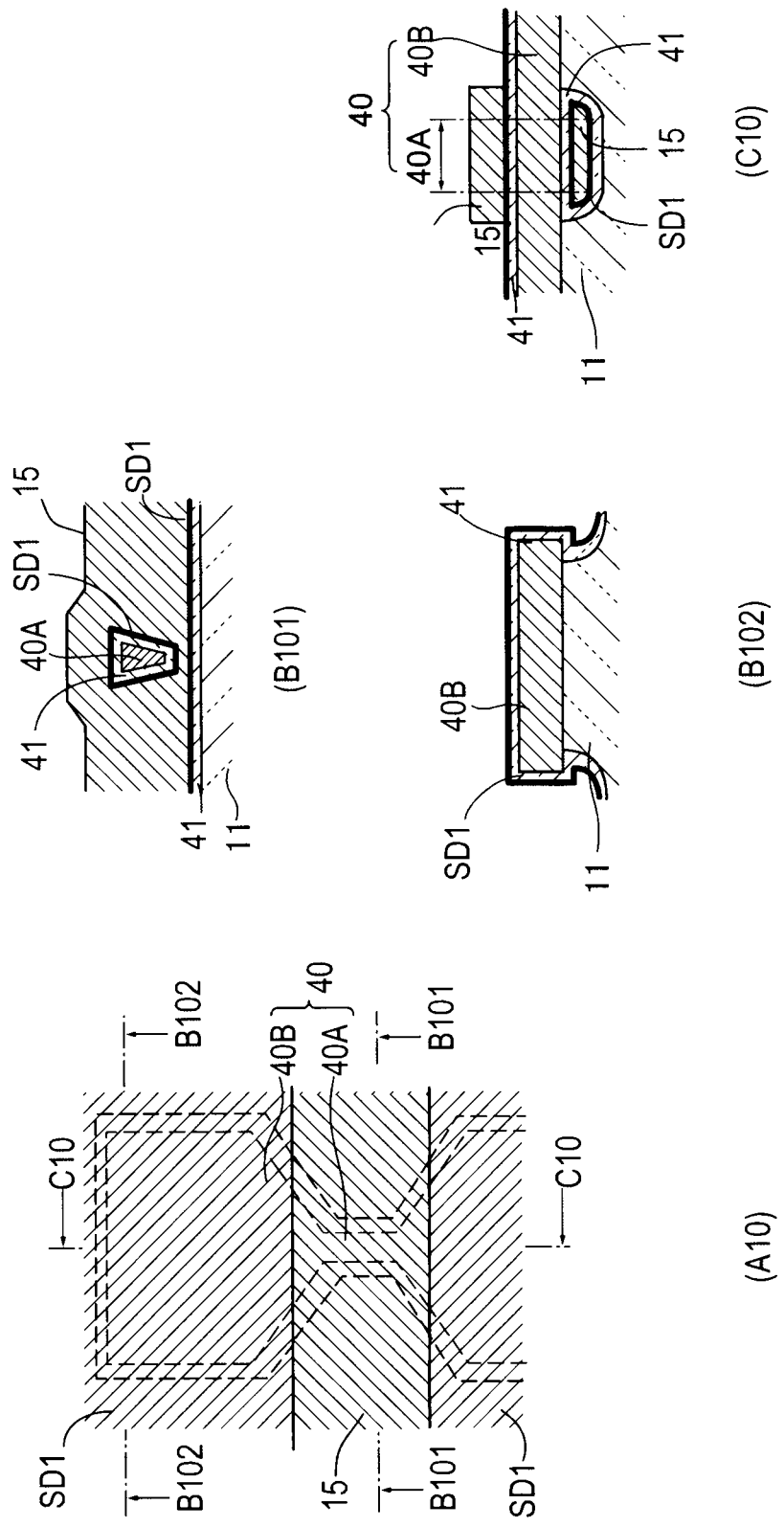
FIG. 15 is a diagram showing a step after the step shown in FIG. 14, wherein (A10) is a plan view of the write main magnetic pole film, (B101) is a sectional view taken along line B101-B101 of (A10), and (C10) is a sectional view taken along line C10-C10 of (A10)
Figure 16:
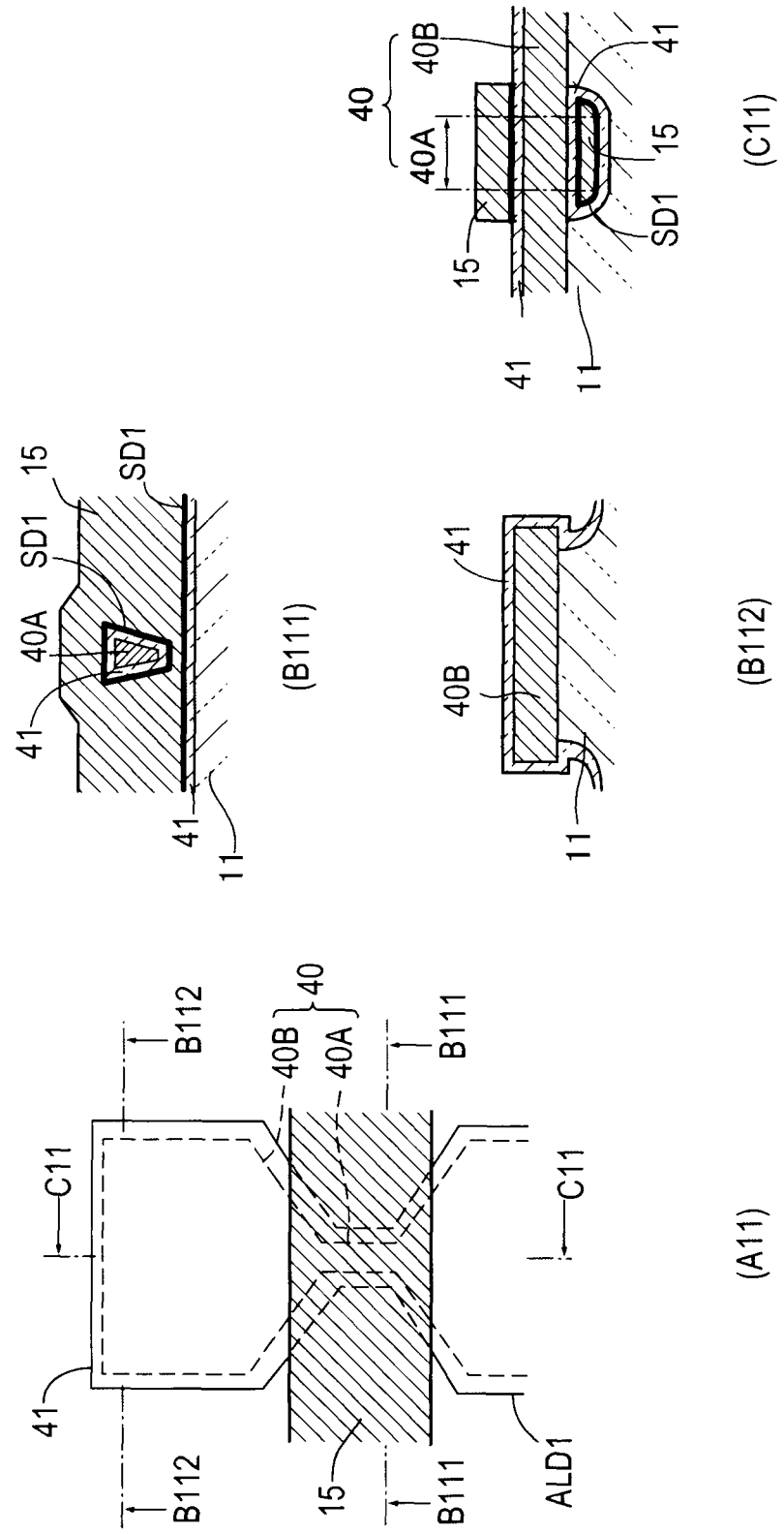
FIG. 16 is a diagram showing a step after the step shown in FIG. 15, wherein (A11) is a plan view of the write main magnetic pole film, (B111) is a sectional view taken along line B111-B111 of (A1), (B112) is a sectional view taken along line B112-B112 of (A11), and (C11) is a sectional view taken along line C11-C11 of (A11)

Then, after the resist film RS2 (see FIG. 14) is peeled off and removed, as shown in FIGS. 15(A10), (B101), (B102) and (C10), the seed film SD1 appearing after removal of the resist film is removed by means of, for example, milling, as shown in FIGS. 16(A11), (B111), (B112) and (C11).

Figure 17:
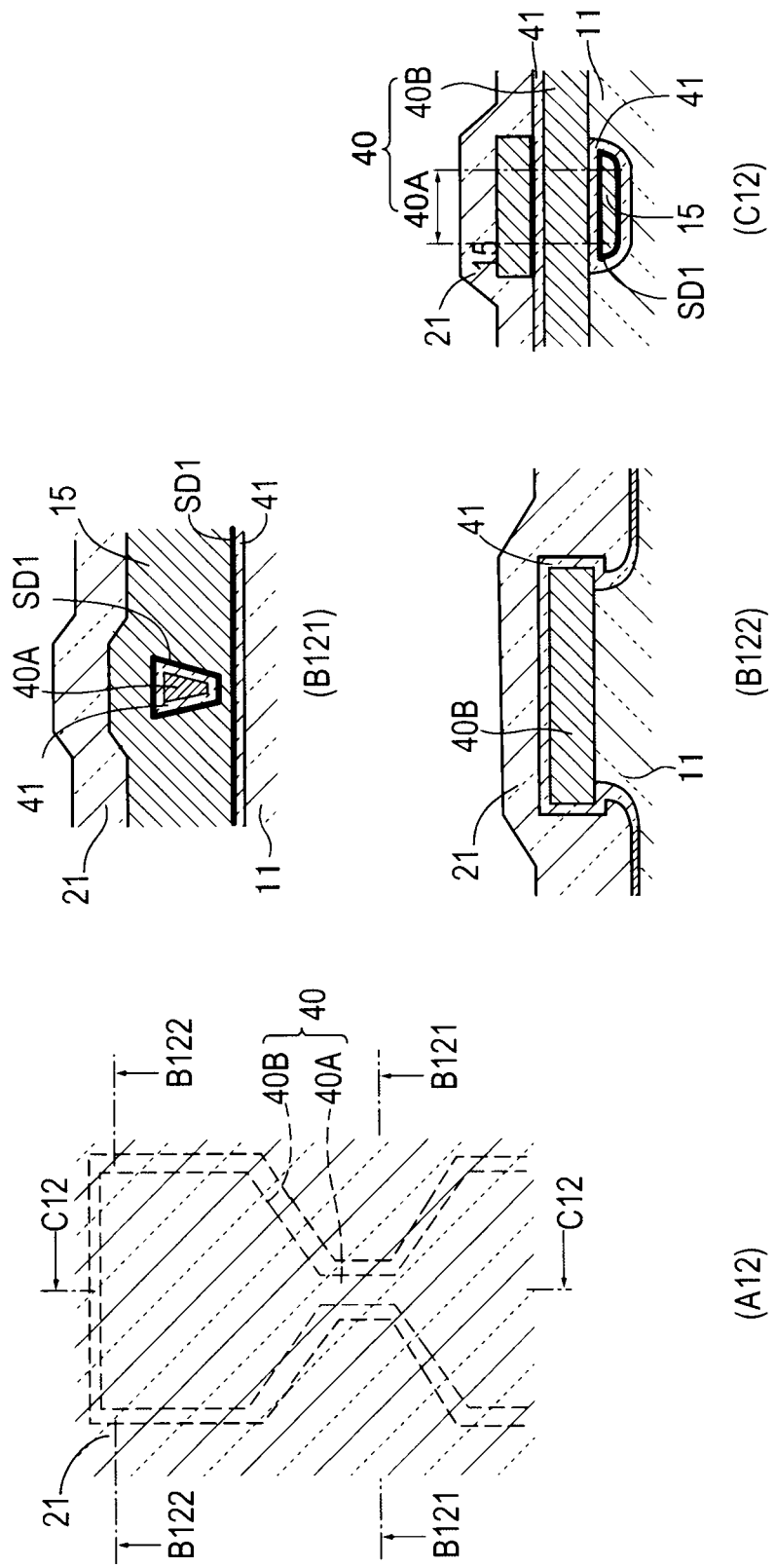
FIG. 17 is a diagram showing a step after the step shown in FIG. 16, wherein (A12) is a plan view of the write main magnetic pole film, (B121) is a sectional view taken along line B121-B121 of (A12), (B122) is a sectional view taken along line B122-B122 of (A12), and (C12) is a sectional view taken along line C12-C12 of (A12)

Then, as shown in FIGS. 17(A12), (B121), (B122) and (C12), the non-magnetic film 21 is formed over the main magnetic pole film 40, the magnetic plated film 15 laid thereon, and the non-magnetic film 11 extending therearound, for example, such that an inorganic insulating material such as $Al_2O_3$ is deposited by ALD method. At this time, since the sputtered film can be deeply applied into the undercut UC3 formed around the body portion 40B, generation of a heterocomponent due to insufficient backfilling of the undercut UC3 formed around the body portion 40B can be suppressed.

Figure 18:
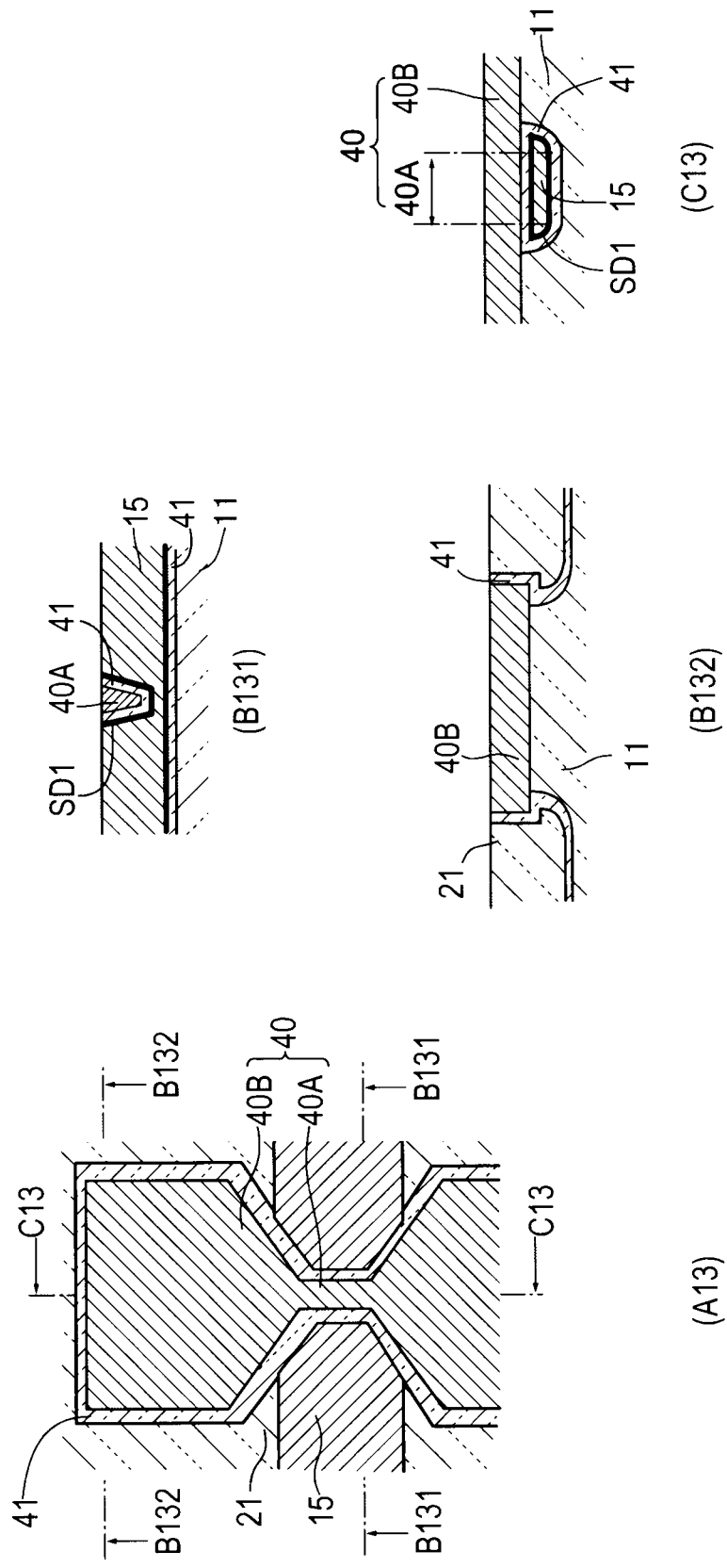
FIG. 18 is a diagram showing a step after the step shown in FIG. 17, wherein (A13) is a plan view of the write main magnetic pole film, (B131) is a sectional view taken along line B131-B131 of (A13), (B132) is a sectional view taken along line B132-B132 of (A13), and (C13) is a sectional view taken along line C13-C13 of (A13)

Then, as shown in FIGS. 18(A13), (B131), (B132) and (C13), mainly the non-magnetic film 21 and magnetic plated film 15 are subjected to CMP (chemical mechanical polishing) for planarization.

Figure 19:
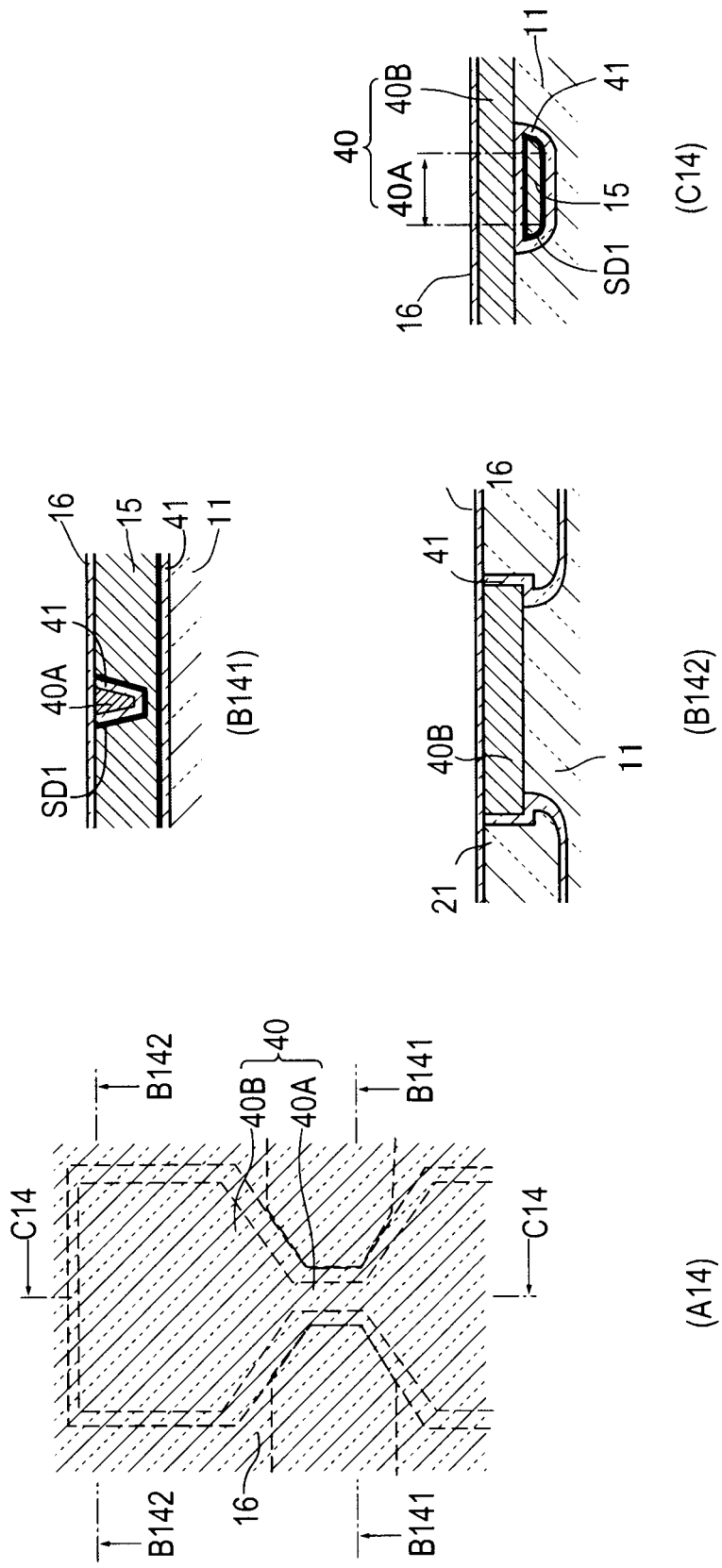
FIG. 19 is a diagram showing a step after the step shown in FIG. 18, wherein (A14) is a plan view of the write main magnetic pole film, (B141) is a sectional view taken along line B141-B141 of (A14), (B142) is a sectional view taken along line B142-B142 of (A14), and (C14) is a sectional view taken along line C14-C14 of (A14)

Then, as shown in FIGS. 19(A14), (B141), (B142) and (C14), the magnetic gap film 16 is formed on the planarized surface of the non-magnetic film 21 and magnetic plated film 15 by means of, for example, sputtering.

Figure 20:
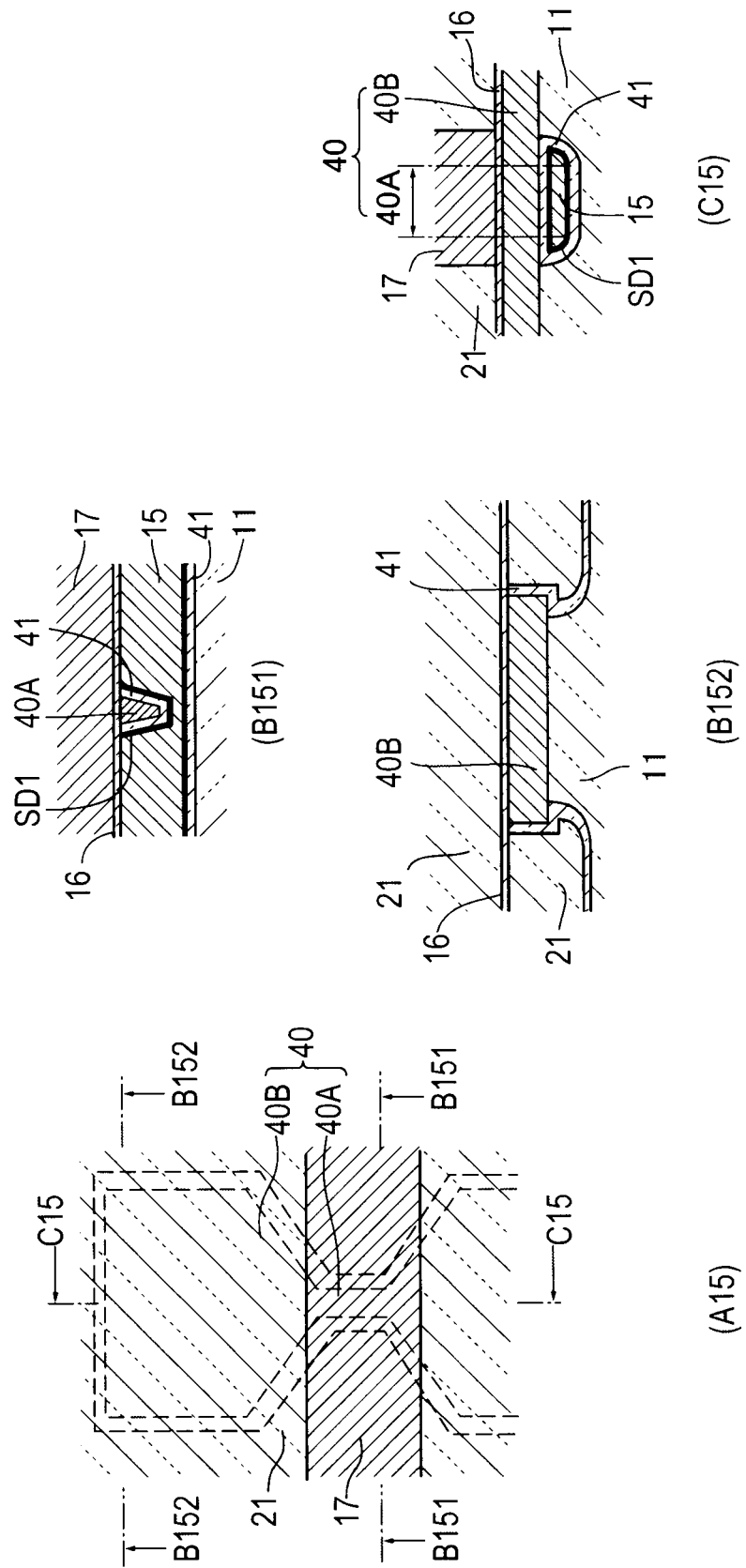
FIG. 20 is a diagram showing a step after the step shown in FIG. 19, wherein (A15) is a plan view of the write main magnetic pole film, (B151) is a sectional view taken along line B151-B151 of (A15), (B152) is a sectional view taken along line B152-B152 of (A15), and (C15) is a sectional view taken along line C15-C15 of (A15)

Furthermore, as shown in FIGS. 20(A15), (B151), (B152) and (C15), the non-magnetic film 21 such as of $Al_2O_3$ is formed on the body portion 40B such as by sputtering, while the second write shield film 17 is formed on the magnetic gap film 16 overlying the write magnetic pole portion 40A by means of, for example, plating. After this, further production steps will be carried out on demand.

The above steps are the ones for manufacturing a magnetic head with a structure shown in FIG. 3. In case of manufacturing a magnetic head with a structure shown in FIG. 5, the steps shown in FIGS. 21 to 25 can be adopted.

Figure 21:
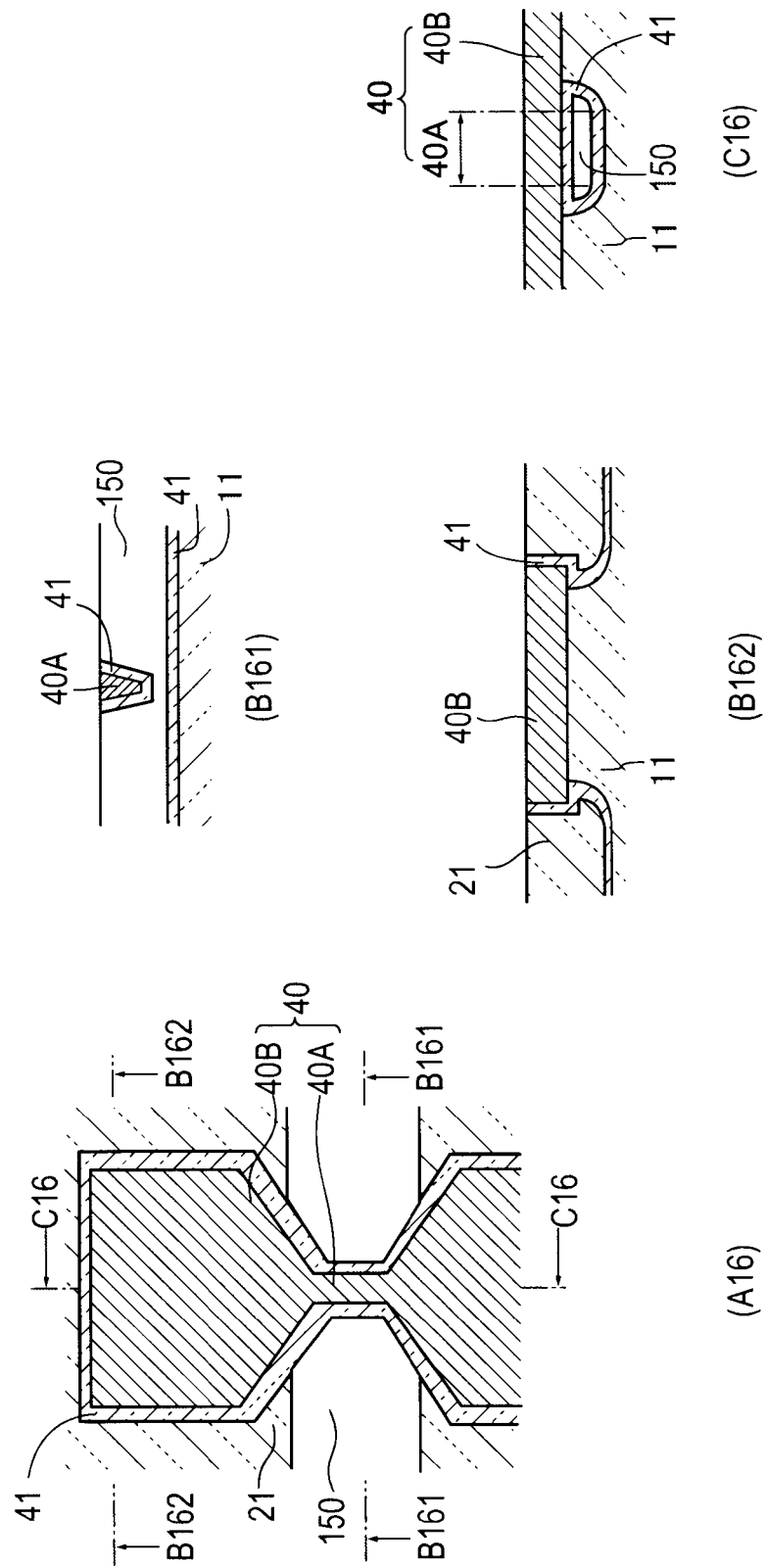
FIG. 21 is according to an embodiment different from that of FIGS. 19 to 20 and a diagram showing a step subsequent to the step shown in FIG. 18, wherein (A16) is a plan view of the write main magnetic pole film, (B161) is a sectional view taken along line B161-B161 of (A16), (B162) is a sectional view taken along line B162-B162 of (A16), and (C16) is a sectional view taken along line C16-C16 of (A16)

At first, the steps shown in FIGS. 6 to 18 are carried out, and then the write shield film 15 is removed by means of, for example, wet etching. This forms a write shield film-removed area 150 at both sides of and beneath the write magnetic pole portion 40A, as shown in FIGS. 21(A16), (B161), (B162) and (C16).

Figure 22:
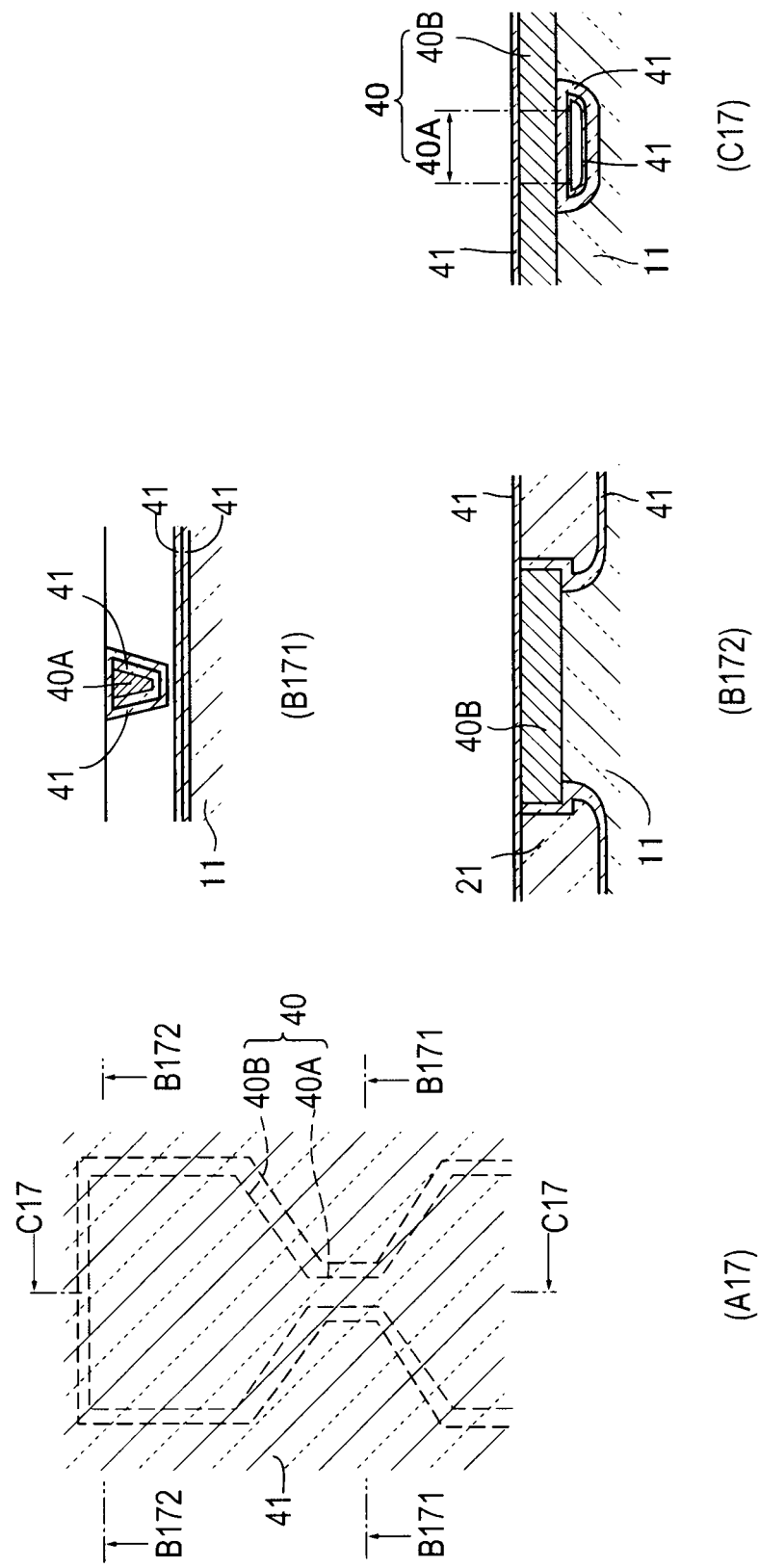
FIG. 22 is a diagram showing a step after the step shown in FIG. 21, wherein (A17) is a plan view of the write main magnetic pole film, (B171) is a sectional view taken along line B171-B171 of (A17), (B172) is a sectional view taken along line B172-B172 of (A17), and (C17) is a sectional view taken along line C17-C17 of (A17)

Then, as shown in FIGS. 22(A17), (B171), (B172) and (C17), the magnetic gap film 41 is formed by sputtering or ALD method. The magnetic gap film 41 widely adheres all around the write magnetic pole portion 40A and onto the body portion 40B and its surroundings with a uniform film thickness.

Figure 23:
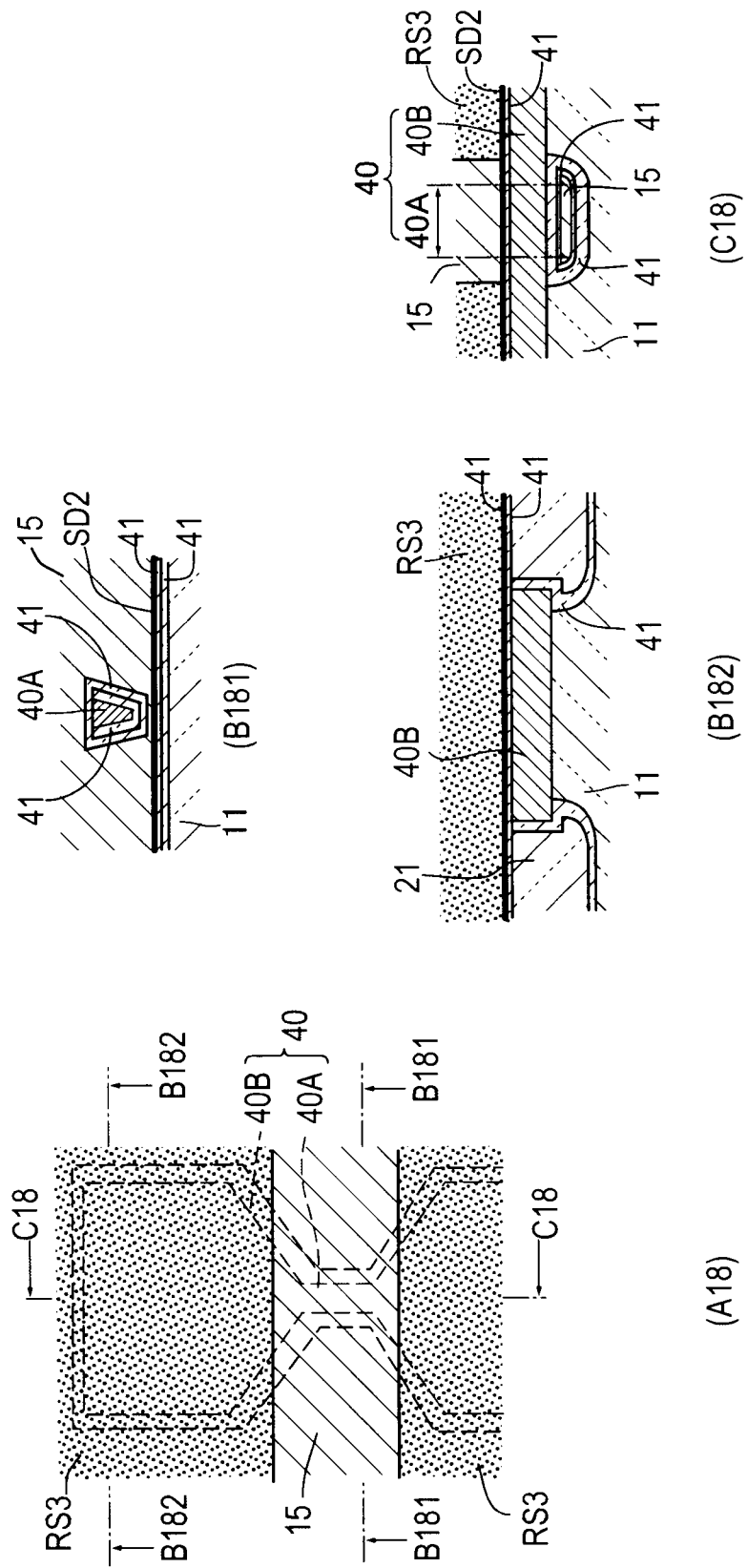
FIG. 23 is a diagram showing a step after the step shown in FIG. 22, wherein (A18) is a plan view of the write main magnetic pole film, (B181) is a sectional view taken along line B181-B181 of (A18), (B182) is a sectional view taken along line B182-B182 of (A18), and (C18) is a sectional view taken along line C18-C18 of (A18)

Then, as shown in FIGS. 23(A18), (B181), (B182) and (C18), after the formation of the seed film SD2 for plating, the patterned resist film RS3 is formed on the body portion 40B and the write shield film 15 is grown on the write magnetic pole portion 40A by plating.

Figure 24:
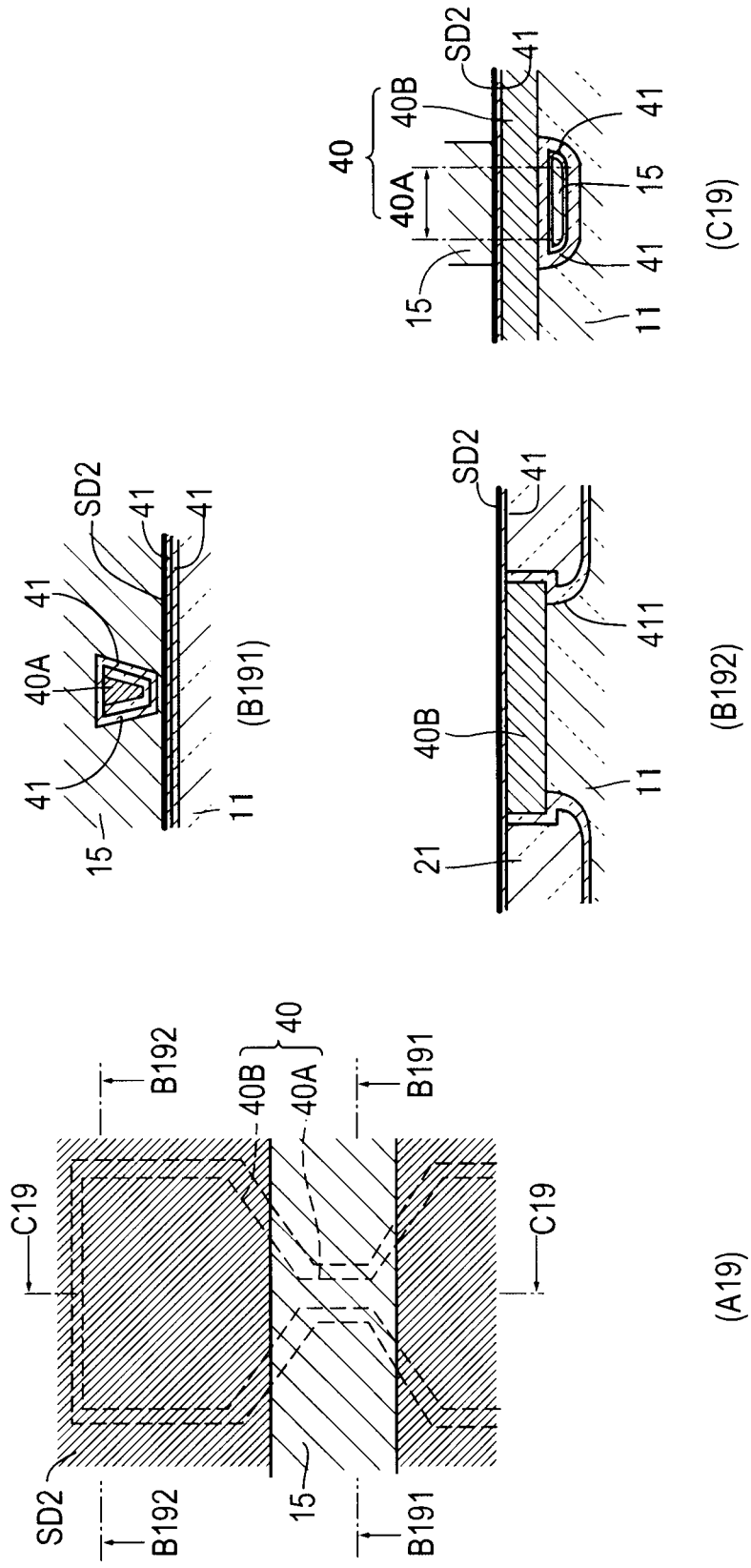
FIG. 24 is a diagram showing a step after the step shown in FIG. 23, wherein (A19) is a plan view of the write main magnetic pole film, (B191) is a sectional view taken along line B191-B191 of (A19), (B192) is a sectional view taken along line B192-B192 of (A19), and (C19) is a sectional view taken along line C19-C19 of (A19)

Then, the resist film RS3 is peeled off, as shown in FIGS. 24(A19), (B191), (B192) and (C19), and thereafter, the non-magnetic film 21 such as of Al$_2$O$_3$ is full sputtered after removal of the seed film SD2 for plating, as shown in FIGS. 25(A20), (B201), (B202) and (C20). Then, CMP or the like is performed for plane grinding of the write shield film 15, and further steps such as formation of the return yoke 20 and formation of the non-magnetic film 21 by sputtering are carried out on demand, thereby realizing the structure shown in FIG. 5.

The present invention has been described in detail above with reference to preferred embodiments. However, obviously those skilled in the art could easily devise various modifications of the invention based on the technical concepts underlying the invention and teachings disclosed herein.

What is claimed is:

1. A method for manufacturing a magnetic head with a main magnetic pole film for perpendicular writing, comprising:

forming, on one face of a first non-magnetic film, said main magnetic pole film with a body portion of a large plane area and a write magnetic pole portion continuous with said body portion and elongated in a plane area;

etching said one face of the first non-magnetic film such that an undercut is formed around the body portion and beneath said write magnetic pole portion, the undercut penetrating beneath said write magnetic pole portion in a track width direction such that said write magnetic pole portion extends from one portion of the first non-magnetic film across the undercut to another portion of the first non-magnetic film;

after filling at least a part of the undercut with an organic filler, lowering a surface of the first non-magnetic film beneath the main magnetic pole film at the undercut by an etching;

after removal of said organic filler, forming a second non-magnetic film to surround an entire perimeter of said write magnetic pole portion and to cover surfaces of said first non-magnetic film in the undercut; and next, forming a write shield film made of a magnetic material to surround an entire perimeter of a portion of said second non-magnetic film which surrounds said write magnetic pole portion, and to fill, below the one face of the first non-magnetic film, the undercut.

2. The method of claim 1, wherein said organic filler is filled in the a portion of undercut beneath the body portion and not in a portion of the undercut beneath the write magnetic pole portion.

3. The method of claim 1, wherein said organic filler is formed by applying a resist on said one face of said first non-magnetic film and said main magnetic pole film and exposing and developing said resist.

4. The method of claim 1, wherein said second non-magnetic film is formed by applying atomic layer deposition.

5. The method of claim 1, wherein said write shield film is formed by plating.

6. The method of claim 1, further comprising:
filling at least the part of the undercut with the organic filler such that the undercut formed around the body portion does not extend laterally beneath said main magnetic pole film during the lowering.

7. The method of claim 1, wherein said undercut formed beneath said write magnetic pole portion forms only one continuous hollow beneath said write magnetic pole portion.

8. The method of claim 1, wherein the lowering comprises further etching said one face of said first non-magnetic film with the undercut to increase a depth of a hollow in said first non-magnetic film.

9. The method of claim 1, wherein the write shield film is made of a nickel-iron alloy or an iron-based alloy.

10. A method for manufacturing a magnetic head with a main magnetic pole film for perpendicular writing, comprising:

forming, on one face of a first non-magnetic film, said main magnetic pole film with a body portion of a large plane area and a write magnetic pole portion continuous with said body portion and elongated in a plane area;

etching said one face of the first non-magnetic film such that an undercut is formed around the body portion and beneath said write magnetic pole portion, the undercut penetrating beneath said write magnetic pole portion in a track width direction such that said write magnetic pole portion extends from one portion of the first non-magnetic film across the undercut to another portion of the first non-magnetic film;

after filling at least a part of the undercut with an organic filler, lowering a surface of the first non-magnetic film beneath the main magnetic pole film at the undercut by etching;

after removal of said organic filler, forming a second non-magnetic film to surround an entire perimeter of said write magnetic pole portion and to cover surfaces of said first non-magnetic film in the undercut;

next, forming a film for plating to cover an entire perimeter of said second non-magnetic film; and next, forming a write shield film made of magnetic material to surround an entire perimeter of a portion of said film for plating which surrounds the write magnetic pole portion, and to fill, below the one face of the first non-magnetic film, the undercut.

* * * * *